(12) United States Patent
Yousefpour et al.

(10) Patent No.: US 11,845,234 B2
(45) Date of Patent: Dec. 19, 2023

(54) ARTICULATED FORMING CAUL FOR COMPOSITE BLANK VACUUM FORMING

(71) Applicant: National Research Council of Canada, Ottawa (CA)

(72) Inventors: Ali Yousefpour, Verdun (CA); Drazen Djokic, Ottawa (CA); Simon Hind, Manotick (CA); Meysam Rahmat, Ottawa (CA); Steven Roy, Montreal (CA); Marc-Andre Octeau, Laval (CA); Jihua Chen, Pierrefonds (CA)

(73) Assignee: National Research Council of Canada, Ottawa (CA)

( * ) Notice: Subject to any disclaimer, the term of this patent is extended or adjusted under 35 U.S.C. 154(b) by 254 days.

(21) Appl. No.: 17/423,140

(22) PCT Filed: Jan. 24, 2020

(86) PCT No.: PCT/IB2020/050580
§ 371 (c)(1),
(2) Date: Jul. 15, 2021

(87) PCT Pub. No.: WO2020/152652
PCT Pub. Date: Jul. 30, 2020

(65) Prior Publication Data
US 2022/0072816 A1    Mar. 10, 2022

Related U.S. Application Data

(60) Provisional application No. 62/796,789, filed on Jan. 25, 2019.

(51) Int. Cl.
*B29C 70/54*    (2006.01)
*B29C 70/34*    (2006.01)

(52) U.S. Cl.
CPC .......... *B29C 70/549* (2021.05); *B29C 70/342* (2013.01); *B29C 70/544* (2021.05)

(58) Field of Classification Search
CPC .... B29C 70/549; B29C 70/342; B29C 70/544
See application file for complete search history.

(56) References Cited

U.S. PATENT DOCUMENTS 4,079,232 A    3/1978    Brokoff et al.
4,812,115 A    3/1989    Kemp
(Continued)

FOREIGN PATENT DOCUMENTS

CN    106142587 B    11/2016
DE    19949923 A1    4/2001
(Continued)

OTHER PUBLICATIONS

Hilmar Apmann, Martin Deepen and Thorsten Flessner, Premium Aerotec GmbH, Automated Draping Processes for CRRP-Parts at Self-heated Preform- and Curing-Toolings, SAE International, 2009; 4 pages.

(Continued)

*Primary Examiner* — Barbara J Musser
(74) *Attorney, Agent, or Firm* — Jason E. J. Davis

(57) ABSTRACT

A vacuum bag system (VBS) for forming pre-consolidated composite blanks has a blank enclosure for sealing around a periphery of the blank, while leaving a second side of the blank exposed, an articulated forming caul (AFC) with at least two facets, each facet effectively jointedly coupled to an adjacent facet, and having a respective, independently controlled, heater integrated with, or coupled to the facet. The VBS further has a forming enclosure for sealing around a periphery of a tool. The blank enclosure brings the blank and the facets into uniform thermal contact resistance and mechanical contact; and permits the articulated AFC to (Continued)

distribute thermal and mechanical load across the blank during forming, even as the facets move to align to faces of the mold.

20 Claims, 11 Drawing Sheets

(56) References Cited

U.S. PATENT DOCUMENTS

| | | | |
|---|---|---|---|
| 5,087,193 | A | 2/1992 | Herbert, Jr. |
| 5,106,568 | A | 4/1992 | Honka |
| 5,116,216 | A | 5/1992 | Cochran et al. |
| 5,156,087 | A | 10/1992 | Cusson et al. |
| 5,158,132 | A | 10/1992 | Guillemot |
| 5,308,571 | A | 5/1994 | Stiles et al. |
| 5,316,462 | A | 5/1994 | Seemann |
| 5,368,807 | A | 11/1994 | Lindsay |
| 5,487,864 | A | 1/1996 | Bartilucci et al. |
| 5,665,301 | A | 9/1997 | Alanko |
| 6,342,115 | B1 | 1/2002 | Pourmand et al. |
| 6,814,916 | B2 | 11/2004 | Willden et al. |
| 7,118,370 | B2 | 10/2006 | Willden et al. |
| 7,186,367 | B2 | 3/2007 | Hou et al. |
| 7,413,694 | B2 | 8/2008 | Waldrop, III et al. |
| 7,862,679 | B2 | 1/2011 | Kulesha |
| 8,303,882 | B2 | 11/2012 | Driver |
| 8,628,639 | B2 | 1/2014 | Thompson et al. |
| 2002/0079617 | A1 | 6/2002 | Kageyama et al. |
| 2005/0253309 | A1 | 11/2005 | Hou et al. |
| 2011/0101556 | A1 | 5/2011 | Bach et al. |
| 2011/0139344 | A1 | 6/2011 | Watson et al. |
| 2012/0006480 | A1 | 1/2012 | Ohya et al. |
| 2016/0046064 | A1 | 2/2016 | Sartor et al. |
| 2016/0183327 | A1 | 6/2016 | Engel et al. |
| 2017/0008266 | A1 | 1/2017 | Humfeld et al. |
| 2017/0100894 | A1 | 4/2017 | Burns et al. |

FOREIGN PATENT DOCUMENTS

| | | |
|---|---|---|
| DE | 10349156 A1 | 6/2005 |
| EP | 0228719 A2 | 7/1987 |
| FR | 2888526 A1 | 1/2019 |

OTHER PUBLICATIONS

Daniel Walxzyk, Jaron Kuppers, Thermal press curing of advanced thermoset composite laminate parts, Center for Automation Technologies and Systems, Center for Automation Technolgies and Systems, Rensselaer Polytechnic Institute, Troy, NY USA, Composites: Part A, 43, 2012; 635-646.

Claire Lynn, Simon Hind, Chun Li, Donald Raizenne, Conductive Heat Transfer and Real-Time Cure Control for Bonding Full Scale Composite Structures, National Research Council of Canada, Ottawa, Ontario Canada, Society for the Advancement of Material and Process Engineering with permission, Government of Canada, 2010; 13 pages.

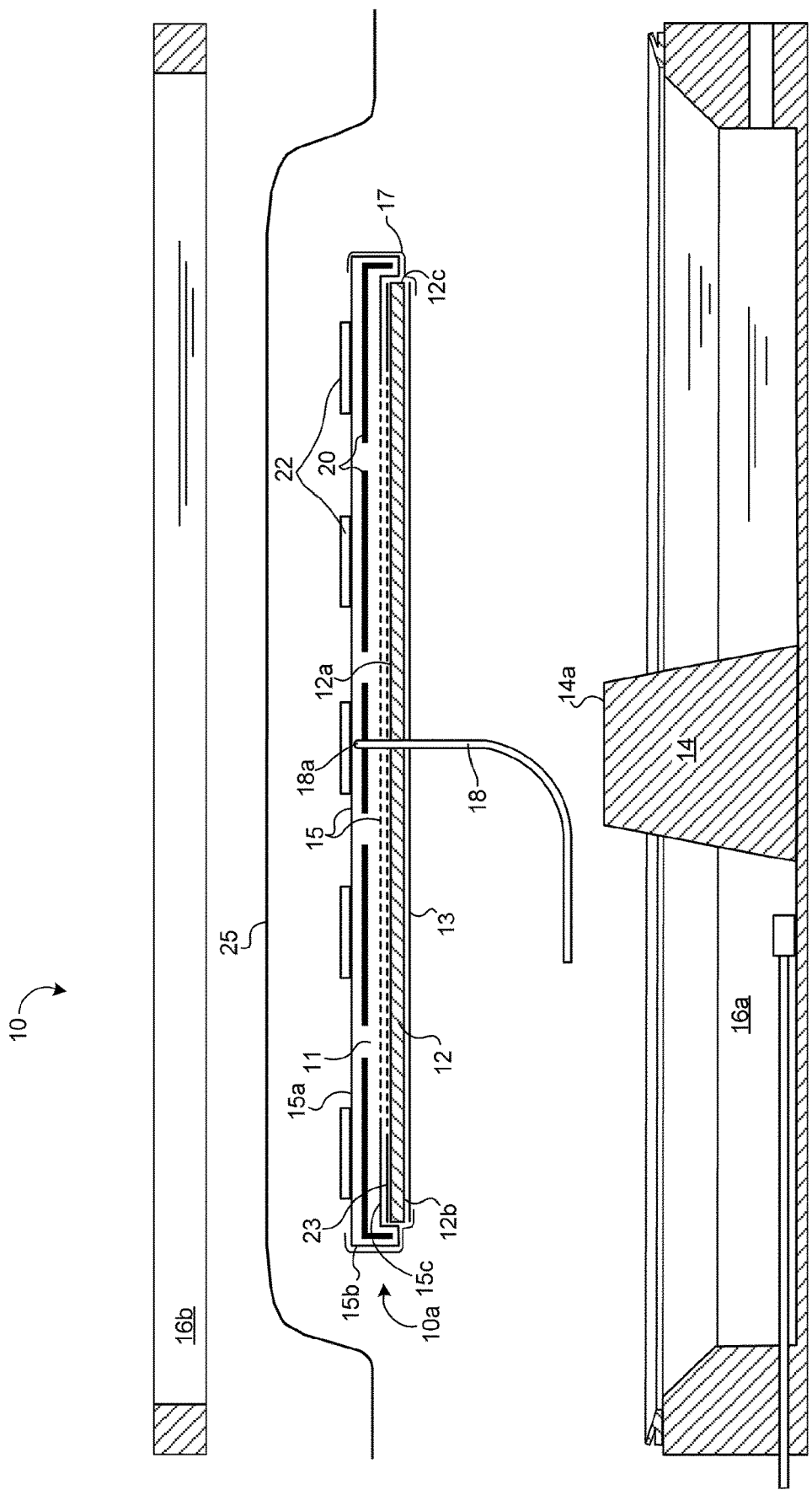

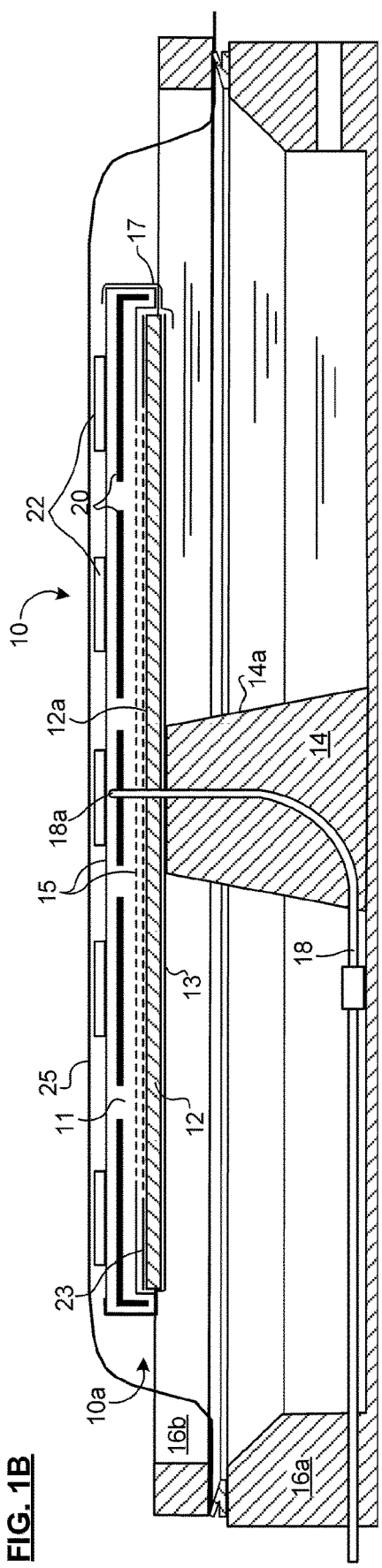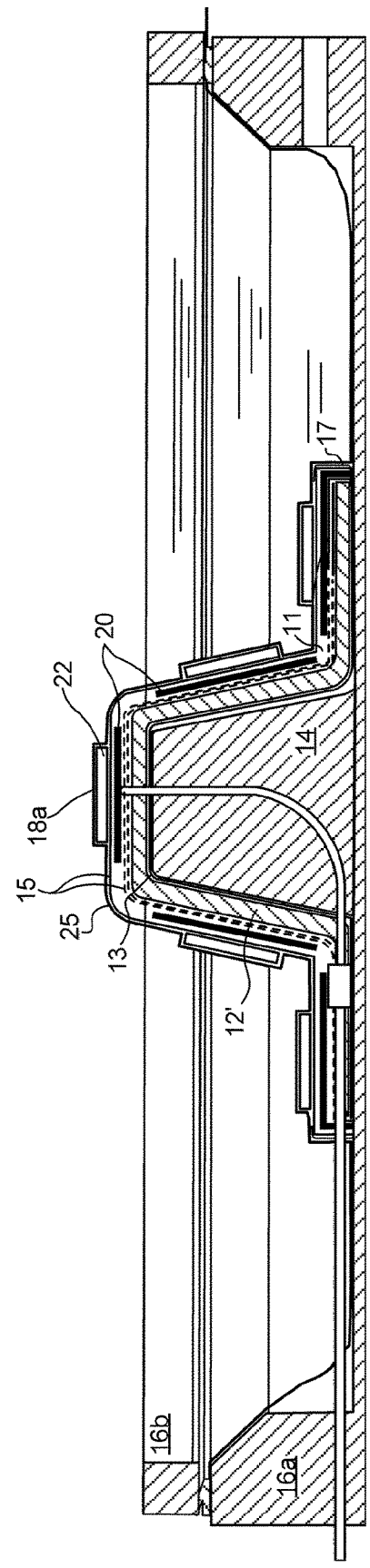

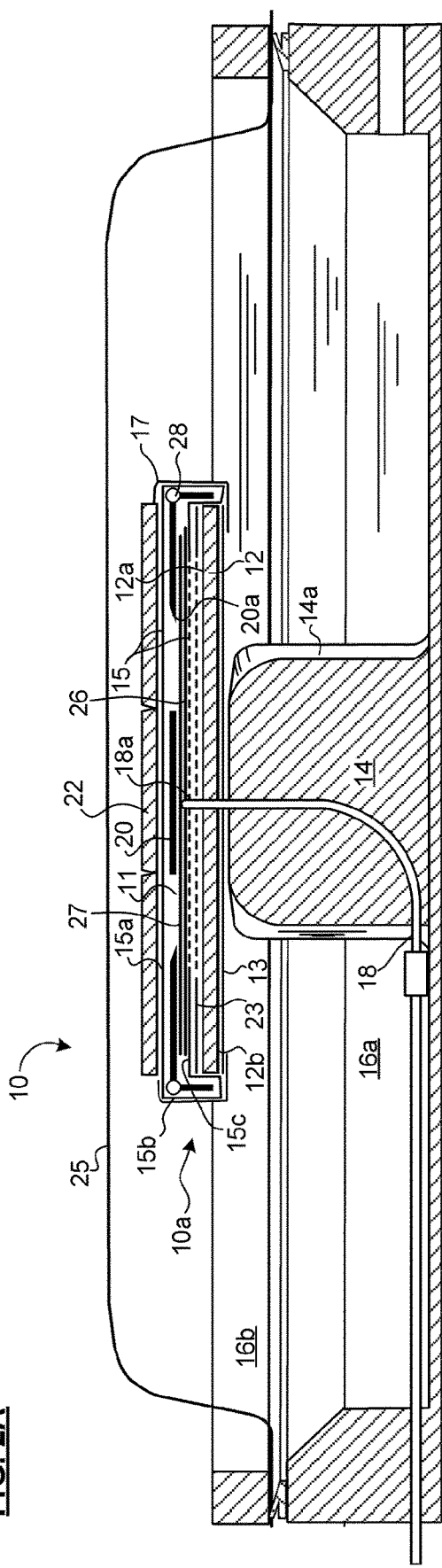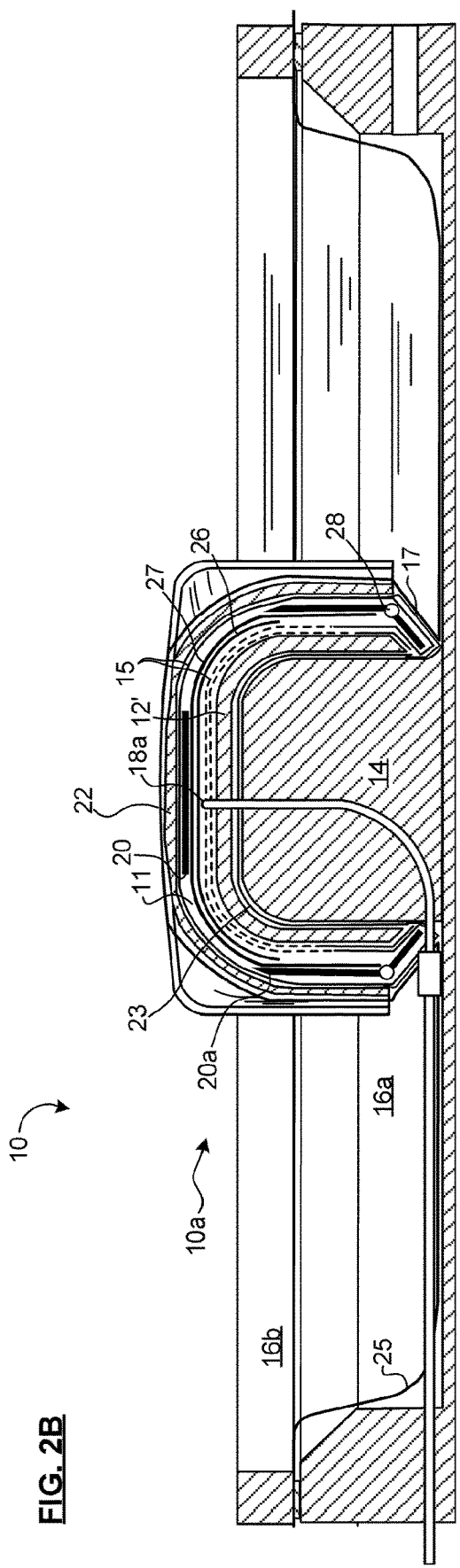

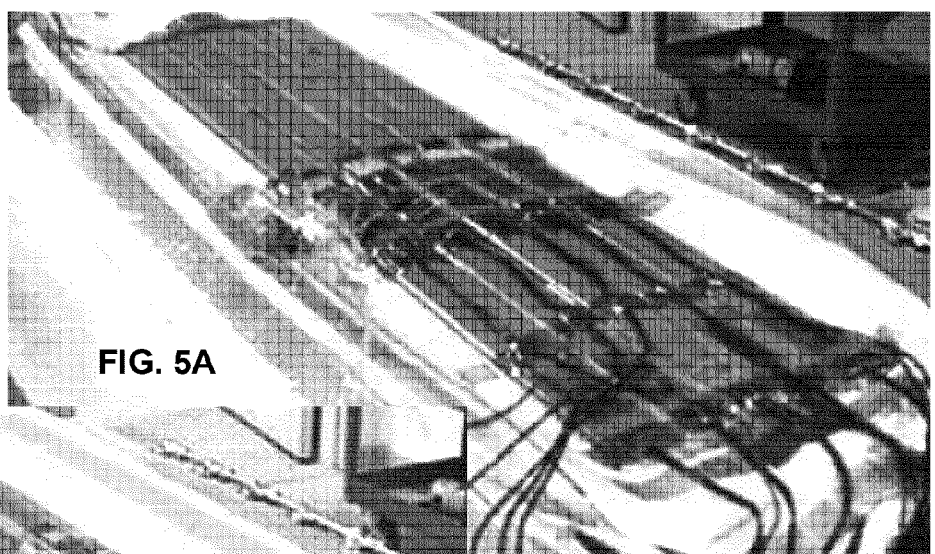
FIG. 5A
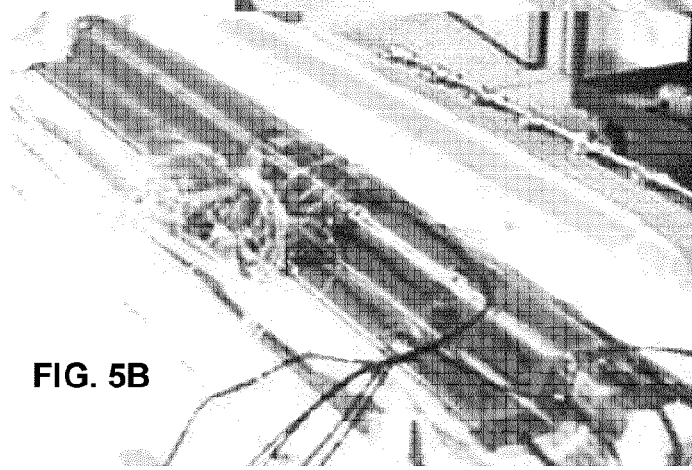
FIG. 5B
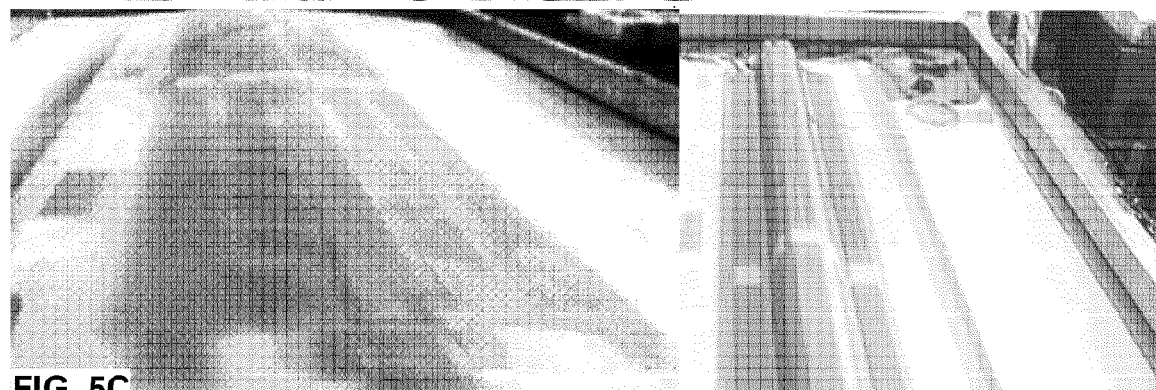
FIG. 5C
FIG. 5D
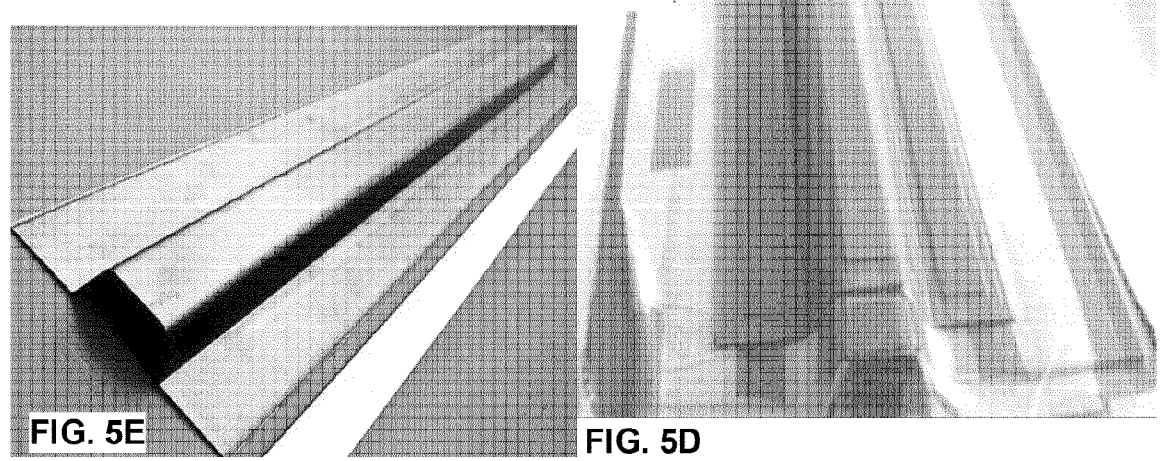
FIG. 5E

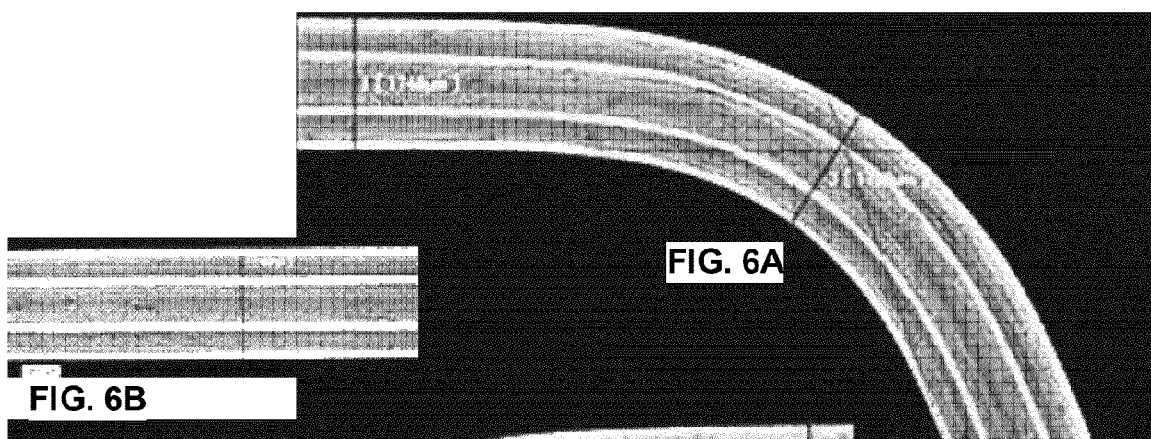
FIG. 6A
FIG. 6B
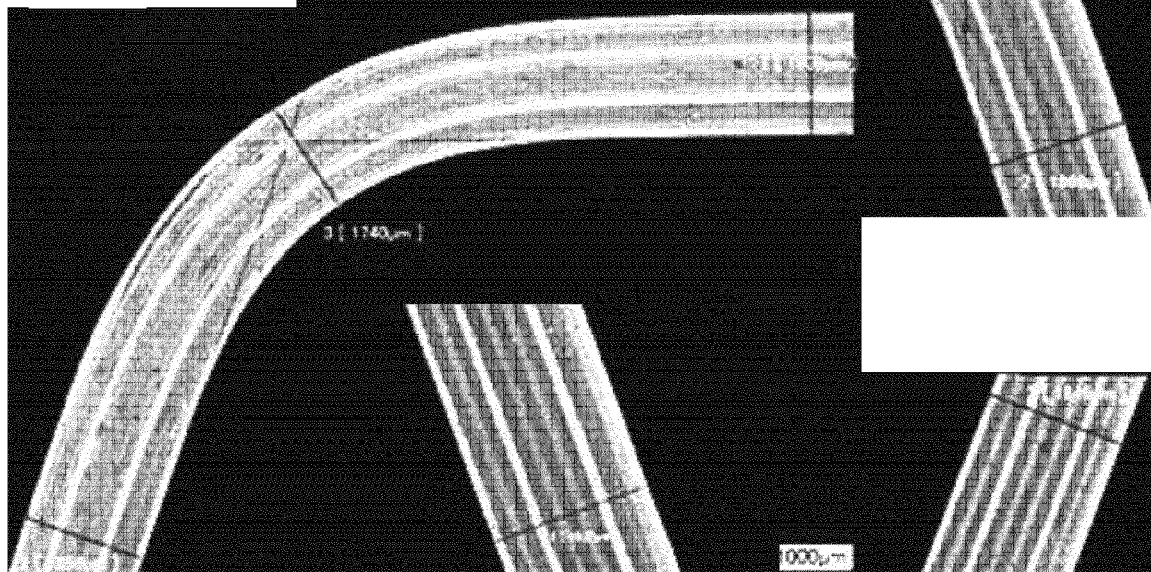
FIG. 6C
FIG. 6D
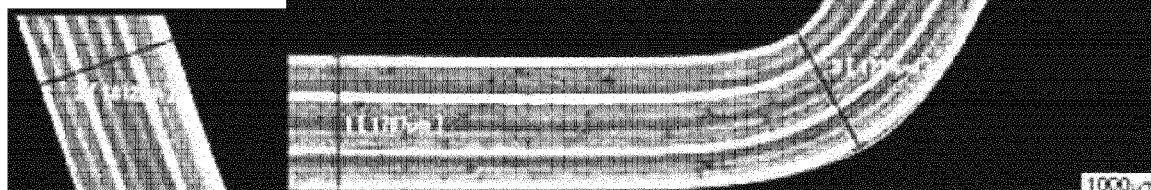
FIG. 6E
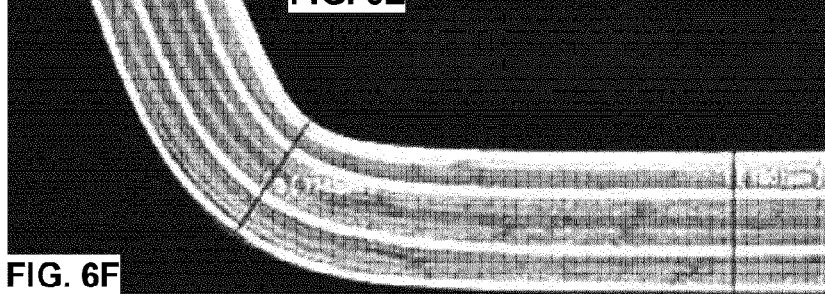
FIG. 6F

ARTICULATED FORMING CAUL FOR COMPOSITE BLANK VACUUM FORMING

CROSS-REFERENCE TO RELATED APPLICATIONS

This application is a national phase entry of International Patent Application PCT/IB2020/050580 filed 24 Jan. 2020, which claims the benefit of U.S. Provisional Patent Application Ser. No. 62/796,789 filed 25 Jan. 2019.

FIELD OF THE INVENTION

The present invention relates in general to vacuum forming pre-consolidated multi-ply prepreg composite blanks, and in particular to a vacuum forming technique for shaping blanks by vacuum drawing a top side of the blank to an articulated forming caul (AFC), and vacuum drawing a bottom side of the blank to a rigid single-sided mold (RSSM), where the AFC has integrated heaters and engineered stiffness to impart thermal and mechanical load to the top side of the blank during vacuum forming, in which joints move relatively stiff AFC forming elements to face complementary RSSM faces.

BACKGROUND OF THE INVENTION

There is a wide and growing market for fiber reinforced/polymer matrix composite (herein "composite") parts, in part because high directional stiffness and low weight allows for designing parts desirable in a multitude of applications. Composites are also resistant to different types of failure mechanisms (e.g. fatigue) that are typically associated with most metal parts, and generally have high environmental (e.g. corrosion) resistances. In the prior art there is a long felt want for high volume, high reliability, low cost production of geometrically large and complex composite parts, but it has been achieved only to a limited extent.

Various methods have been developed for forming composite structures from sheets, ribbons, tows, or tapes of woven or aligned fibers in a resin matrix. A majority of these methods involve stacking or "laying up" a plurality of plies, usually with different ply orientations in different layers, onto a tool or mandrel for forming. Composite part design often tailors the part strength and stiffness in preferred directions, by selecting these orientations and numbers of plies. Layup on a forming tool ensures every layer is individually formed to a desired contour and the shearing force required to form multiple plies simultaneously need not be considered. As is most common in aerospace manufacturing "prepreg" ribbons (i.e. tape or tows, or bands of tows) are laid-up, where the ribbons consist of oriented fibers pre-impregnated with the resin; although liquid moulding processes, that involve injection of resin after a "dry" layup is stacked, are also known. The least automated prepreg fabrication method is "hand" layup, where the plies are cut to shape and stacked according to a plan for the part. A stack of plies is debulked by applying pressure, most commonly vacuum pressure, to consolidate the part, and remove air, at layup intervals.

Automated placement machines provide more automated methods of layup of prepreg of various widths (tows, tapes, etc.) to buildup parts. The advantages of this approach are high placement accuracy, ability to steer tows, and start/stop anywhere on the surface of the part, allowing for more complex build-up of materials for tailored shape and optimized mechanical performance. Automated placement allows for rapid deposition of material on relatively simple geometries, and application of local heat and pressure can reduce the need for debulking, but supplying the heat and pressure during automated placement requires special care at tight radius curves and bends. A basic limitation on the speed of automated layup is the speed at which tape can be added when depositing over a surface with abrupt changes in surface geometry, or in tow orientation. While large structures of simple geometry, and small complex geometrical parts, can be built up, the time to form larger structures with complex geometries by automated layup are substantial, and the equipment costs are high. For some limitations on a number of plies that can be applied and the heat that can be used to ensure consolidation. If a thermoset is used, it is not just the cost of forming at risk, but whether a monolithic part can be formed. Furthermore the heat required for automated layup has some risks for aging the composite material, in conjunction with the time out of freezer.

Most common aerospace composites use toughened thermosets as matrix, as they form crosslinked polymer chain networks, which gives them high stiffness and strength, and therefore are very stable once cured. Their non-reversible chemical reaction (cure) is initiated by heat, and, since it is autocatalytic, it can be inadvertently and prematurely initiated by heat. Because of inherent material reactivity, manufacturers and certification authorities impose handling specifications that limit the time that a composite part may be at or above a given temperature. The material has a defined shelf life in prescribed low-temperature storage and corresponding out-life at room temperature, both of which are carefully logged. It is preferred to consolidate the largest structures to form a single piece, as these reduce weight, stress concentration, and manufacturing costs associated with couplings. While efficient material handling management permits very large parts to be formed with logged time in and out of the freezer, premature curing remains an issue with automated layup of larger and thicker parts, and parts with complex geometries that require more time to deposit. Thus thicker parts, especially those that have complex geometry, are far more challenging to produce.

Thermoplastic composites can alternatively be used, however they require much higher forming and joining temperatures, but even thermoplastic composite forming by automated placement can be too time consuming and expensive to build up thick, complex parts.

The drawbacks of automatic placement machines also include high equipment costs for the machines, especially if the part geometry includes abrupt changes in curvature, as these require higher dexterity manipulators. While the efforts to accelerate deposition rates of automated placement machines may continue to increase the physical envelope of geometrically simple parts, and complexity of parts, there remains a need for forming thicker parts with complex geometry.

During layup, the part needs to be consolidated (debulked), and after layup the part is cured with heat and pressure (e.g. inside an autoclave or a press, or subjected to vacuum (if out of autoclave resins are used)). The two or more of the layup, debulking and curing are sometimes, but not necessarily, performed in the same single-sided mold, typically called a tool, and is referred to herein as a rigid single-sided mold (RSSM). It is most common to use a vacuum bagging system with a RSSM to debulk because it is particularly effective at venting trapped air. When vacuum debulking is performed, minimal heat may be applied along with higher pressure. Therefore, if only vacuum pressure is applied, a forming element, or caul plate, is known to be used to sandwich the part with the single-sided mold. An example of such a system for consolidating and curing a layup is taught in U.S. Pat. No. 7,186,367 to Hou et al. Hou et al. teaches advantages of a two stage curing process with a double vacuum bag system. Both vacuum bags surround both the tool/single-sided mold, and the forming element. No forming of the blank is shown. U.S. Pat. No. 5,116,216 also teaches a single vacuum bag with two enclosures for debulking, again without forming the prepreg.

Applicant notes that several other double-bag vacuum systems are known for other purposes. U.S. Pat. No. 7,862,679 appears to use two bags to decrease risks from a tear in one of them. Also, in liquid injection resin transfer molding, double bags are used with one set of bags active during liquid resin injection to control flow of a liquid front, as is taught by U.S. Pat. No. 5,665,301. Liquid resin injection molding is not an analogous technique.

According to the background of invention of EP 0228719 (App. #86201382), due to the high costs of curing in autoclaves and manual layup, some effort has been focused on developing cost-effective methods to form or machine parts from sheet stock, or pre-consolidated multi-ply laminates, of thermoplastic or thermoset resin composite. "Several proposals" (none specified) reportedly had been made to utilize point contact, such as via belts, pressure rollers, or shoes, to provide the pressure needed for consolidation. To supply the necessary heat, suggestions had been made to heat the material just before entering the pressure area or heat the material while in the pressure area via the use of a heated roller or hot shoe. EP 0228719 then lists a number of problems with these proposals, including difficulties with friction, achieving uniform pressure, coordinating heat and pressure, contact transference, and difficulties forming parts of variable thickness.

Applicant notes that the idea of permanently deforming a pre-consolidated sheet stock or multi-ply laminate with a simple heated roller or hot shoe (although it may have been suggested prior to 1985) is not believed to be feasible, especially if the deformation includes changing curvature of the composite to a high degree (e.g. a low radius bend of a high angle, or even large radius bends of parts in different directions), because an amount of reorientation and relative movement of fibers required to move from a planar configuration to a highly altered arrangement, while retaining spacing and integration with the matrix, is exceedingly difficult. During the heating of the resin, its viscosity drops dramatically, which influences the pressure's effect on the sheet/laminate in different zones around the bend. While it is possible to manufacture a composite part to a desired net shape, or to manufacture a composite part with a desired arrangement of fibres, using such a process; it is extremely challenging to control both the shape of the product, and the arrangement of fibers within the product.

EP 0228719 goes on to propose and claim a technique for consolidating i.e. "pressing or uniting materials" using an air bearing. This allows for high pressures to be applied, with local controlled heating, without contact issues of presses. While layup, debulking, consolidation, and curing, are all expressly identified, pressing against a single-sided mold to substantially deform a preconsolidated blank is not mentioned. To be clear, minor variations from planarity, such as "pad up" and "ply drop-off", which impart millimetric (at most) deviations in the fibre reinforcements, might be made with the proposed system, but large scale deviations do not even make sense with the system. There is no way to scan over a surface in the way described, if the surface has sharp angle bends and significant depth (deeper than the cushion and "thin film of pressurized fluid, such as air"). This reference teaches localized heaters for temperature control during the "consolidation", and makes use of a high pressure supply of air for pressing, instead of a caul or press. It is reasonably clear that pressing a preconsolidated blank against a single-sided mold of very different shape is not disclosed by EP 0228719, it is certainly not enabled.

An article by Hilmar Apmann, Martin Deepen and Thorsten Flessner entitled "Automated Draping Processes for CFRP-Parts at Self-heated Preform- and Curing-Toolings" (SAE Technical Paper 2009-01-3211, 2009) reports a method for supporting larger size carbon fiber reinforced polymer laminates (dry or prepreg) for manipulation, forming and curing. The simulated preforming shown in FIGS. 7 and 8 appear to show a channel-shaped mold that permits a gradual formation of high curvature folds in a sheet. A heated mold and mechanical press, of kinds is used to apply local heat. The method was not demonstrated, and it is not clear how fiber wrinkling issues would be addressed.

U.S. Pat. Nos. 6,814,916 and 7,118,370 to Willden et al. teach a Forming Method for Composites, and a Composite Part Drape Forming Machine that is said to form a charge that is preferably "assembled by a CNC tape laying machine that lays plys [sic.] in precise locations in the charge at alternating angles". The method minimizes wrinkles by reducing a shear zone where plies are sliding past one another during molding. Advantageously, the shear zone is limited in size and the amount of shear because the overhanging portion of the composite charge is held substantially parallel to the first surface of the mandrel, resulting in an "S" shaped bend in the composite charge. The method patent notes that the laminate plies of the composite charge do not shear past one another where the composite charge is already in contact with the mandrel, or where the plies are held (in the overhang area). As a result, the shear zone area is minimized. Minimizing the shear zone is said to substantially reduce or eliminate out-of-plane buckling of the composite fibers in the composite prepreg plies. Supporting the overhanging portion during forming also keeps the inner plies under tension. The offered solution to minimize shear requires edges of the composite to be strong enough to support the charge throughout this forming. It is noted that many advantages are offered by tapering edges of composite parts for lighter weight, although this could not be achieved according to these teachings. Furthermore, the limitation of the shear zone to the space between the overhang area and first surface contact with the mandrel, along with the tensioned fibers, reduces wrinkling risks, but also reduces the flexibility to form a wide array of desirable parts, notably any parts that has any "bookending" or net shearing at the edges.

In a paper by Daniel Walczyk and Jaron Kuppers entitled "Thermal press curing of advanced thermoset composite laminate parts" (Composites: Part A 43, 2012, pp. 635-646), thermal press curing is compared with autoclaving. Thermal press curing is a process for curing layups with a customized rubber-faced mold. The process requires a complex tooling setup. This prior art teaches one way of applying uniform pressure to retain a pre-formed layup during curing, while limiting movement of the fibres with respect to each other and the surrounding matrix.

U.S. Pat. No. 5,158,132 to Guillemot teaches a high temperature electrical heater with a heat distribution plate and temperature regulation means for heating each of nine zones. The plate may be assembled with a mechanical support in the form of a press plate, and assemblies of heater modules can be built up with side-by-side placement. An assembly of heaters is thus known for locally heating tooling in a press for composite forming.

U.S. Pat. No. 5,368,807 to Lindsay teaches a method for joining separate, pre-formed composite parts using a vacuum bag system; ostensibly "[a]lthough the method has been described using pre-formed prepreg details (stiffeners) and prepreg skins, the method and apparatus is applicable to wet lay-ups and resin transfer molding". The method involves: pre-forming the stiffeners; placing these on an inside portion of a rigid part of the vacuum bag; debulking; pneumatically actuating the rigid part, and sealing. Skin plies are then laid up on a primary mold, and the bag is installed on the mold. The bag is evacuated to effect the joint. The part can then be cured "in an oven or autoclave". It is therefore known in the art to include actuable rigid parts into a vacuum bagging system.

In the current airframe manufacturing environment, and for many other parts in other industries, it is desirable to form high stiffness, load bearing composite structures (such as fuselage, empennage, vertical stabilizer, wing box, etc.). While many composite parts may be thin enough, and deposited quickly enough, to take advantage of automated ribbon placement, the cure budget or time and expense of automated placement makes thicker and/or geometrically complex parts difficult or infeasible. Techniques for forming pre-consolidated composite blanks with presses and rubber forming may work for some parts, but is not generally applicable because of the difficulties controlling thermal and mechanical loads to ensure both the part's overall shape and fibre arrangement. A technique for forming pre-consolidated, substantially unshaped blanks, is needed, especially one that allows for internal heating and controlled surface finish.

SUMMARY OF THE INVENTION

Applicant has discovered a technique for forming blanks of composites (e.g. carbon fibre reinforced thermoset or thermoplastic matrix composites), to allow for a high degree of deformation, or complexity of deformation, of thick parts, with minimal tooling and equipment investments. This method provides improved control over fibre and matrix movements during forming of preconsolidated blanks by ensuring intimate contact between an articulated forming caul (AFC) and the blank. The AFC comprises a set of jointed forming elements. Each forming element has a facet that provides individual and independent heating for respective regions of the blank that will be formed to define faces of a part to be formed. The joints may be mechanical joints such as hinges or slides, fabric-type hinges, or elastic members with highly differentiated response to different strains, including attachment of forming elements to vacuum bagging material with predefined gaps. The joints allow the forming elements to make intimate contact with the blank prior to forming, and to move and deform with the blank into contact with corresponding faces of a rigid single sided mold (RSSM). The deformation of the blank, and the intimate contact, are made possible by a two-enclosure vacuum bagging system (VBS). The VBS defines a blank enclosure for drawing a top side of the blank and the AFC together, and a forming enclosure for drawing the bottom side of the blank to the RSSM. The blank enclosure ensures that the blank and AFC remain in registration throughout forming, even if the jointed forming elements of the AFC and blank are subjected to substantial relative movement during the forming. The jointed forming elements, vacuum bag, and possibly other elements of the AFC, together provide stiffness for controlling final geometry, while more compliant, hinged areas that define the joints, facilitate gradual corner deformation that respects the delicate balance between the fibres and matrix in the blank. Advantageously, the AFC, VBS, and RSSM are light, relatively low-cost tooling, and can, in a single operation, form blanks having many layers of prepreg.

A copy of the claims is incorporated herein by reference.

Accordingly, a vacuum bag system (VBS) for forming pre-consolidated composite blanks is provided. The VBS comprises a blank enclosure with: a first barrier membrane adapted to cover a first side of the blank; a first seal dimensioned to seal the barrier around a periphery of the blank leaving at least a forming part of a second side of the blank exposed for forming, and a first evacuation system; an articulated forming caul (AFC) comprising: at least two forming elements, each element having a stiffness greater than that of the first barrier membrane, and defining a facet facing a region of the first side blank within the forming part; at least one independently controlled, heater integrated with, or coupled to the element, adapted to heat the facet from room temperature to at least 150° C. within 1 hour; and a forming enclosure with a second barrier membrane, a second seal dimensioned to seal the barrier around a periphery of a rigid single-sided mold RSSM, and a second evacuation system, where the elements of the AFC are receivable within the blank enclosure, or bonded to an interior or exterior of the first membrane. As such, actuating the first evacuation system with the AFC in place, and a blank sealed against the first seal, brings the facets into uniform thermal contact resistance, and mechanical contact, with the blank; and sealing the second seal around the RSSM with the blank and facets in place over the RSSM, forms a closed vacuum forming chamber between the RSSM and the second side of the blank, that can be depressurized by the second evacuation system to form the blank to the shape defined by a space between the RSSM and the AFC.

As is conventional in the art, the VBS may further comprise a breather material or a release film between: the first side of the blank and the facets, or the first membrane, if the facets or membrane would otherwise pose a sealing risk with the blank's forming part; or the second side of the blank and the RSSM, if the RSSM would otherwise pose a sealing risk with the blank's forming part. The release film may have a selectively perforated area that covers at least the forming part of the blank.

The AFC may further comprise at least one joint between each forming element and an adjacent forming element, the joint comprising one of: a mechanical hinge joint, a translational joint, a fabric-type hinge, or an elastic joint having low resistance to bending relative to all other degrees of freedom. The fabric-type hinge or elastic joint may be provided by adhering the forming elements to the first membranes, with sufficient spacing between them that the first membrane provides the jointing material.

The first membrane may have: puncture holes for receiving wires for the heaters and a seal around the wires; markings for mounting the heaters on an external side thereof, in alignment with the forming elements mounted on an internal side thereof; markings for aligning integrated forming elements and heaters; or the forming elements and heaters bonded thereto.

The second membrane may be a peripheral strip surrounding the first membrane, with a third seal between the first and second membrane, or may be dimensioned to cover the blank enclosure, and is mechanically separable from the first barrier membrane.

The AFC may further comprise a metallic stiffener positioned between the facets and the blank, the stiffener providing at least one of the following: an elastic spring back for releasing the AFC from the blank or release film after forming; a heat diffusion medium for distributing heat from the heaters more uniformly across the forming part of the blank; shielding the blank from imprint features otherwise imparted by AFC components during forming.

The first evacuation system may comprise a port with a valve that permits a closure of the blank enclosure once a desired vacuum is established, while seals to the forming enclosure are established and the closed vacuum forming chamber is evacuated, and then opened to equilibrate pressures within the blank and forming enclosures.

The heaters may be provided by an array of heaters integrated into a flexible sheet that covers the first membrane.

The VBS may be provided in a kit with the RSSM, which has at least two mold faces of differing mean orientation, and an edge between the two mold faces aligns with a spacing between the adjacent facets. The differing mean orientation includes an internal angle of 5-150°, or 210-355°.

The kit may further comprise program instructions for controlling the heaters, in response to a temperature sensor in the RSSM, or AFC, or for controlling an evacuation system.

The kit may further comprise blanks.

Also provided is a vacuum forming system, the system comprising: an interfacial vacuum bag having a sealing edge for sealing against a periphery of a preconsolidated, multilayer polymer composite reinforced blank; at least two forming elements in or on the interfacial vacuum bag, each element having a facet oriented to face substantially normal to a respective region of a first surface of the blank; an evacuation port and pump for evacuating air between the facets and the blank; at least one heater for heating the facets of the forming elements, where the forming elements are separated by a gap, and having an effective joint permitting the elements to pivot during a forming process; least one temperature sensor for measuring a temperature of the blank; a forming tool; and a forming vacuum bag surrounding the interfacial vacuum bag, and heater elements on the tool, for evacuating air between the forming vacuum bag and the tool.

Furthermore, a technique for forming a composite part is provided, by: placing an articulated forming caul (AFC) into or onto a blank enclosure of a vacuum bag system (VBS), the AFC comprising at least two forming elements, each forming element having a blank-facing facet, where each forming element is effectively jointedly coupled to at least one adjacent forming element; and having a respective, independently controlled, heater integrated with, or coupled to the forming element; sealing the blank enclosure against a periphery of the blank leaving a second side of the blank exposed, at least over a forming area thereof; depressurizing the blank enclosure the to bring the blank and the facets into uniform thermal contact resistance, and uniform mechanical contact; placing the blank and enclosure into a registered position on a rigid single-sided mold (RSSM); sealing a forming enclosure around a periphery of the RSSM; and evacuating the forming enclosure to draw the blank into conformity with the RSSM while controlling heat delivered respectively to the facets, to facilitate substantial deformation of the blank with the facets moving from an initial pose in contact with the blank into a position meeting respective faces of the RSSM.

Forming the composite part may further comprise cooling the part; subsequently heating all facets of the part concurrently to relax any stresses built up in the part during forming; inspecting the part; or heating all facets concurrently to cure the part.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 1A-C are schematic cross-sectional illustrations of a first embodiment of the present invention, for forming a stringer, featuring kit as arranged for use including a two-enclosure vacuum bag system (VBS), in disassembled, assembled, and finished poses of a method of the present invention;

FIGS. 2A,B are schematic cross-sectional illustrations of a second embodiment of the present invention, for forming a tapered spar featuring a kit as used, including a VBS, in assembled, and finished poses of a method of the present invention;

FIGS. 5A,B are photographs of a first stringer forming example, respectively showing a two-enclosure vacuum bag system with integrated inner and outer bags, prior to forming, and post-forming;

FIGS. 5C,D,E are photographs of a second stringer forming example showing a two-enclosure vacuum bag system with separable inner and outer bags, prior to forming, and post-forming, respectively, and a formed part;

FIGS. 6A-F are micrograph images of cross-sections of a stringer formed using the first stringer forming example, respectively showing a right top bend; the top; a left top bend; a right sheared web; a left base bend; and right base bend;

DESCRIPTION OF PREFERRED EMBODIMENTS

Figures 3A, 3B:
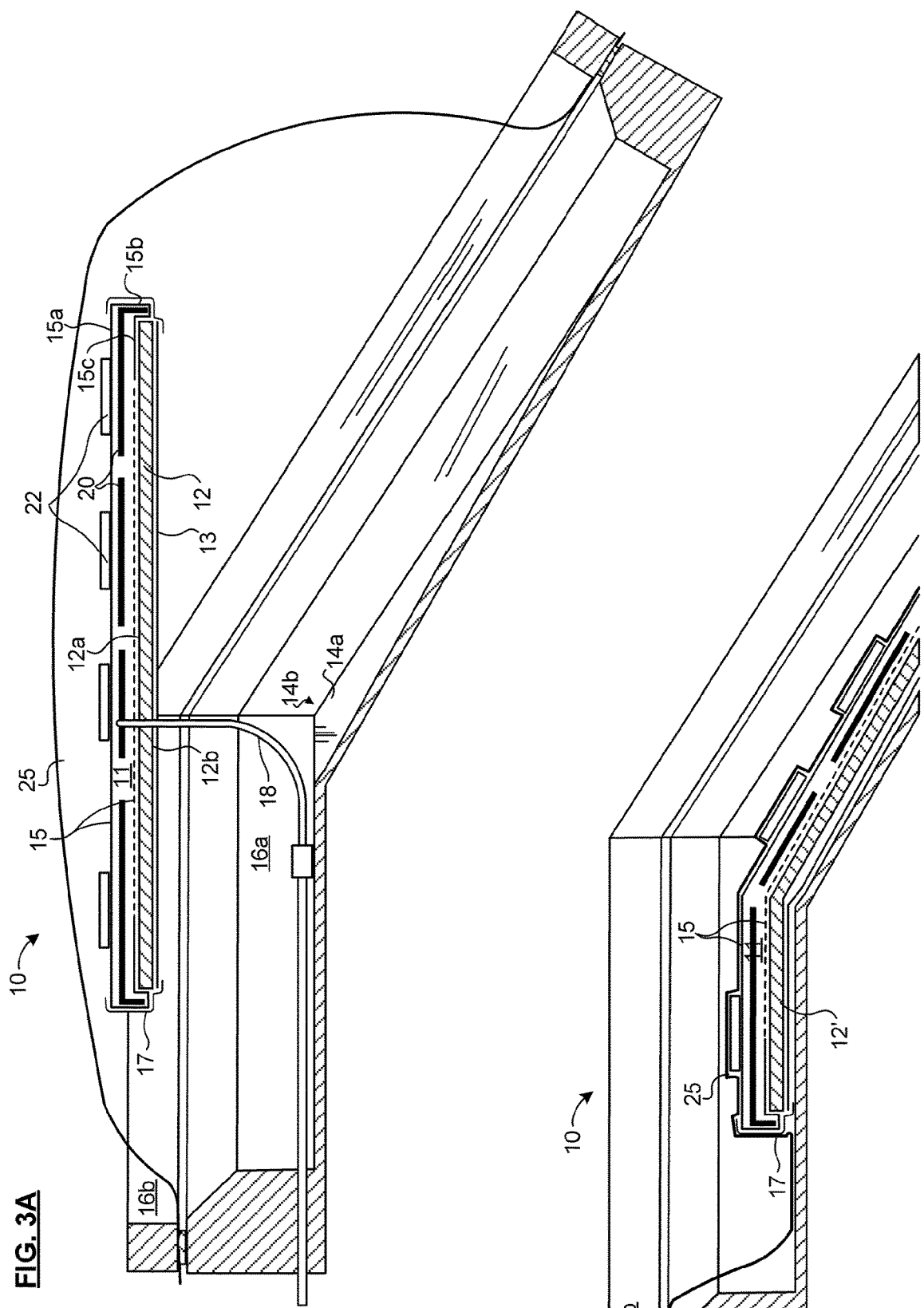
FIGS. 3A,B are schematic cross-sectional illustrations of a third embodiment of the present invention, for forming an L shaped frame, featuring a bag, and kit as used, in assembled pose, and in partial view, as a formed part.

Herein a vacuum bagging system (VBS), kit for forming the same, and method of forming preconsolidated composite blanks is provided. The VBS for forming pre-consolidated composite blanks has two enclosures: a blank enclosure and a forming enclosure. The blank enclosure is provided for sealing around a periphery of the blank, enclosing one side while leaving at least a forming part of the other side of the blank exposed. An articulated forming caul (AFC) is provided with at least two forming elements, each defining facets for facing respective parts of the blank. Each facet is effectively jointedly coupled to an adjacent facet, and has a respective, independently controlled, heater integrated with, or coupled to the facet. The AFC is receivable within the blank enclosure, either because it is attached to the enclosure, because it has markings for directing the mounting of the forming elements to the enclosure, because it has holes for passing electrical leads for the heaters, or because the forming elements are dimensioned to fit with the enclosure, while the seal is in place around the blank. The blank enclosure is actuable to bring the blank and the facets into uniform thermal contact resistance and mechanical contact by depressurization of the blank enclosure. The forming enclosure is provided to draw the blank around a rigid single-sided mold (RSSM).

The generalized hat stiffener stringer is shown in FIGS. 1A-C. FIG. 1A shows a kit consisting of a VBS 10, having two main components: an inner bag system 10a defining an enclosed inner bag volume 11, shown in sealed position with the blank/preform 12, to produce an inner bag assembly; an outer bag system 10b, and an enclosure (16a,b) for effecting the forming. The kit also includes an RSSM (tool) 14 which is located inside a base frame 16a. The RSSM 14 may be sourced separately from the remainder of VBS 10, and is preferably anchored to the base frame 16a by fasteners (not shown) rather than integrated therewith.

In the illustrated embodiments, the preform or blank 12 is shown as a flat sheet cut to a desired rough shape, as is typical. The blank 12 may be of an alternate form that is simple to consolidate or laminate, such as a low curvature cone, a cylinder, a spheroid, ellipsoid, paraboloid, or hyperboloid, or geometrically less regular shape, or any section, segment, frustum, or cutting thereof, as these may be better approximations to the part to be formed. While the blank 12 is shown cut to fit the mold, as this simplifies illustration, it will be appreciated that the formed section of the blank may be a small fraction of the blank, and the blank may be rolled or gathered within inner or outer bags. The composite blanks may be commercially sourced, or fabricated with various simplified layup machines that are fast, require very little cure time, and are well consolidated or laminated. Generally speaking, blank thickness can range between 10 to 100 plies or more depending on part thickness, tool geometry, material properties and process limitations. Thicker blanks are more suitable for simpler tool geometries, more stable material viscosity parameters (i.e. wider processing window), and fewer additional process limitations. Consequently, blanks up to 2 inches thick may be formed depending on process conditions. Applicant has demonstrated forming of 15-48 ply blanks.

The preform 12 is a debulked flat composite blank, to be shaped according to the RSSM 14 by a forming process using the VBS 10. It could be thermoset resin-, or a thermoplastic resin-matrix composite, with a fiber reinforcement of carbon fiber, glass fiber, aramid fiber, for example. The material system of the blank 12 may or may not include other reinforcements, such as nanoscale reinforcements. The VBS 10 can be designed for forming any composite materials known in the art, as well as new materials, once the material is characterized from a viscosity and cure kinetics perspective, to choose appropriate forming temperatures, evacuation regimes and times. Forming components must be selected to withstand the required forming temperatures. For thermoset resins, these would typically be well under 150° C. (such as 50-120° C., or 60-105° C.), but for thermoplastics the forming temperatures is typically above 200° C. (such as 205-360° C.). The blank 12 may be a consolidated stack of prepreg layers (fiber which is pre-impregnated with resin). As prepreg materials are typically delivered on rolls with backing paper, the backing paper 13 may be left on the bottom of the preform as a release material (or another release material 13 may be used), to provide a constant, reliable, coefficient of friction with the tool surface 14a.

The inner bag assembly includes an inner bag 15, which is sealed against a periphery of the blank 12. As shown, the sealing is performed with a tape, which is one form of a seal 17. The tape may be a flashbreaker tape tab: a Pressure-Sensitive Adhesive Polyester Tape used as a secondary method to attach the blank to the inner bag, to ensure that the blank is properly located. Seal 17 can be any industry-typical seal that withstands an intended forming operation.

The seal 17 seals the inner bag 15 at its side edge 15b and bottom edge 15c to the blank 12 from a bottom surface 12b, a peripheral edge 12c, and/or via the release material 13. Preferably the seal 17 meets the blank 12 only at a region that surrounds a formed part of the blank, the surrounding region being cut away after the forming. Other sealing arrangements are equally possible or more convenient for other situations, though it is generally preferable to seal the blank on the surrounding region (top or bottom) if that gets trimmed, as any marking or imprinting of the seal 17 will not affect the formed part. There is an operative seal between the blank and the inner bag 15, all around the inner bag assembly. The inner bag volume 11 is a space between an outer surface 15a of the inner bag and the blank. At least an outer surface 12a of the blank the formed part of the blank 12 is effectively adjacent the inner bag volume 11. An inner bag exhaust line 18 is provided with a pump and controller for evacuating the blank enclosure, the line 18 exiting the inner bag 15 at port 18a, which may be through an otherwise flat face of the inner bag (e.g. at outer surface 15a), preferably at a location where the inner bag does not appreciably deform (e.g. adjacent a strip 20), or at an opening in the seal 17 adjacent the surrounding region of the blank 12. The port 18a is typically adjacent a breather material that ensures airflow across the volume 11: this breather material may be integrated with the inner bag 15, strips 20, and or release materials surrounding the blank 12.

The inner bag assembly (which is one embodiment of an articulated forming caul) further includes a set of 5 stiffening strips 20 that serve as forming elements, in that they modify a stiffness profile of the inner bag assembly, to engineer a force distribution applied by the evacuation of the inner bag 15. Each of the strips 20 is in thermal conductive contact with a respective heater 22, although there could be several heaters or heating elements, for each strip 20. The heaters 22 may be silicone wire wound strip heaters, which contain a uniform resistance wire winding along a length of the heater which is sandwiched and cured between two thin layers of silicone. Alternative known heaters use etched foils instead of wire conductors, and these may be separated by mica, Kapton, and/or other thin, high temperature, insulators. The strips 20 are preferably also chosen for thermal conductivity, to distribute heat to respective regions of the blank 12 as effective for the process.

The strips 20 used in this embodiment may be formed of copper, aluminum, or an alloy of one of these, and as such have a high thermal conductivity compared to the composite blank materials. They could alternatively be made from steel, or other metals with suitable thermal conductivity and stiffness to promote the required heating and forming effect. Note that the distal strips 20, as illustrated, fold over the edges of the blank for better thermal efficiency. These bends and sides grip the peripheral edge of the blank and reduce motions of the strips 20 during forming, to avoid misalignment. Without the bends and sides, the strips 20 would tend to bunch up or pull together under vacuum load, although other sealing arrangements can be leveraged to avoid these effects.

The inner bag assembly, when evacuated, keeps the strategically placed heaters 22 and the strips 20 (as well as any sensors such as thermocouples of the inner bag system 10*a*) in reliable contact with the blank (through any breather, or release material as called for). Each strip 20 is metallic or polymeric sheet having a blank-facing inner surface and an outwardly facing surface, and has two main functions: to conduct thermal energy from the heaters to enable localized, controlled heating; and to locally modify the stiffness of the inner bag/preform assembly. There may be a controlled adhesion of the inner bag 15 with both the heaters 22 and strips 20 to ensure the coordinated movement, the controlled adhesion being provided at least when the inner bag 15 is depressurized and Coulomb friction effects enhance resistance. The local control of heating and locally engineered stiffness cooperate to permit vacuum forming of thick blanks, or complex geometries in an innovative manner.

In the illustrated embodiment, the strips 20 may be adhered to inner surfaces of the inner bag, or hinged, or otherwise mechanically coupled together. For example, flexible tape may constrain the relative motions of the strips 20 to ensure that they remain in place while still being able to bend and deform relative to one another. Hinges may also be typical piano hinge type, elastomeric, say of cured silicone, or another thermoset elastomer or thermoplastic elastomer which will maintain proper strip position while permitting relative motions. By adhering the strips 20 to the inner bag, or jointing them with hinges or tape, the forming elements become an AFC. Selection of a sufficient spacing between the strips 20 reduces thermal conduction between them (allowing them to be independently heated), and ensures an effective hinge joint, as required for forming this stringer. Naturally mechanical hinges, elastomeric joints, stops, blocks, and spacers can be used to guarantee spacing of the strips 20 throughout forming.

The heaters are coupled to outer surface 15*a* of the inner bag or the strips 20 through the inner bag. Alternatively, the heaters can be inside the volume 11, with wires extending through the inner bag, for example, if that improves thermal response time of the heaters. The strips 20 may also, alternatively, have integrated heaters within them, and there may be no effective distinction between these two elements, in alternative embodiments, although this would call for a different sealing solution. Both the heaters 22 and the strips 20 may alternatively be mounted to an exterior surface of the inner bag. If so, some attention may be made to ensuring that the inner bag has a uniform thickness across the strips 20, so that both mechanical and thermal loads can be uniformly transmitted to the blank.

The inner bag assembly constitutes one embodiment of an articulated forming caul by inclusion of the set of 5 strips 20 that serve as articulated strips 20, in that they impart mechanical load applied by the evacuation of the inner bag. Each strip corresponds to one of the 5 surfaces of a top-hat stringer, that are defined by the RSSM's surface 14*a*. These 5 surfaces can be best seen in FIG. 1C, where the blank has assumed the form of part 12'. The illustrated stringer forming application permits all shearing to be localized in certain parts ("shear webs") of the blank which are associated with the regions adjacent the two heaters that are not horizontal in FIG. 1C, thereby avoiding "bookending" of the postformed part. The square end of the finally formed part is what allows the simple ninety degree bend of the distal strips 20.

The heaters are independently controlled, which means that at least some of the heaters can actively supply heat while others do not. In a preferred embodiment, each heater is independently configured, and is responsive to a respective sensed temperature at an adjacent region, given stage of forming. It is at least desired, for the present embodiment, that the central and distal edge strips (which are horizontal in both initial and final states shown in FIGS. 1B,C) remain unheated, while the remaining two edge strips are heated, as this is used for the intended forming process. Localized heating ensures that only the shearing webs of the blank are heated, thereby 1) reducing the viscosity of the composite material allowing plies to slide only where needed; 2) avoiding unnecessary heating and possible curing of the blank; while acting like a shear force clamp (so called "freeze" areas) away from the shearing webs. Localized stiffness modification (from the strips 20) encourages the inner bag assembly to deform in a pre-determined and controlled manner. Limiting the amount of shearing web area relative to the forming part of the blank simplifies control over fibre movement, and strongly constrains the overall freedom of movement of the fibres, in comparison with global heating techniques. Minimizing the shearing area of any composite part reduces the probability of generating numerous defects (wrinkles, waviness, ply tearing, etc.) that plague prior art composite forming processes.

The inner bag assembly is shown including a layer of release layer 23 covering the blank 12, which may cooperate with the breather material to promote air flow and distributed evacuation of air in the bag, for drawing the strips 20 and heaters 22 against the blank. The breather material may be a thin, non-woven polyester material suited for low pressure applications, to facilitate uniform thickness and limited gas permeability, although any industry-typical composite processing breathing material which can withstand the heater temperature may be used. Release layer 23 may be a fluorinated ethylene propylene (FEP), typically used as a release layer in composite fabrication. Any alternative non-stick film, several of which are known as common consumable materials in the composite manufacturing industry, could alternatively be used. The release layer 23 features a perforated window in the middle and a solid (air impermeable) perimeter. The release layer 23 prevents the blank 12*a* from sticking to the inner bag 15*c* after forming, or after forming and curing, while allowing air to flow through the perforated area to permit the vacuum seal between the blank and the volume 11 (albeit discontinuously). The perforations in the FEP extend an opening in the inner bag, called the "perforated window", which covers with the formed part of the blank. The effect of the FEP is to permit a suction seal of the non-perforated FEP around the periphery of the blank on the top side, which acts in concert with the tape seal at the bottom and around the inner bag, to produce a two stage seal that leverages the surface area of the periphery of the blank effectively. The perforations of the release layer 23 and inner bag 15 may be co-formed, but preferably are not, and the exact alignment of these perforations as illustrated is schematic. The scales of the perforations of 23, 14 may differ by at a factor of 2 so throughholes through both layers are uniformly distributed.

It will be appreciated that if the strips 20, and the interior surface of the inner bag 15, have surfaces that are not susceptible to choking off against the blank, and would not stick to the blank as a result of the forming, neither a breather nor a release material would be used. Both the breather and release, or the breather alone, may be integrated into surfaces of the strips 20, or if the strips 20 are positioned behind the inner bag 15, on the inner bag's interior surface(s). The breather is typically necessary to prevent bubbles or pockets of sealed air from forming as these effectively partition the volume 11 into regions of different pressures, known as "choking off". Such pockets of air present challenges for uniform conveyance of thermal and mechanical load, and are generally avoided by providing a felt or like uniform thickness, porous, flow conducting media.

The inner bag 15 itself can be any industry-typical composite processing bagging material able to withstand the forming regime. In the examples hereinbelow, a high elongation nylon film material is used. Different composite processing bagging materials tend to trade off stretchability and durability. Rubber inner bags are appropriate for higher volume industrial applications to resist the abuse associated with regular use.

The outer bagging system 10b is an enclosure defined by a base frame 16a, an outer bag 25, and a cover frame 16b. As shown, the base frame 16a has two ports respectively for evacuating the inner bag 15 and the outer bag 25. The outer bag 25 may be made from a reusable silicone membrane (as was used in the examples), or may be replaced with any elastomeric material with sufficient % elongation at tear and durability. Consumable outer bags have been made of industry-typical bagging materials such as those used during composite part autoclave cures. The outer bag 25 is sealed by closing the cover frame 16b against the base frame 16a. The cover frame 16b therefore is principally a sealing member. The cover frame 16b and base frame 16a are typically manufactured from the same material and is likely to be either aluminum or steel. A set of releaseable clamps (not illustrated) are typically used to hold the cover frame 16b onto the base frame 16a throughout forming. The inner bag 15 holds the strips 20 and heaters 22 in position with respect to the blank, and the outer bag 25 exerts pressure to deform the whole inner bag assembly, with the AFC, to conform to RSSM 14.

Base frame 16a is a perimeter frame surrounding the RSSM 14, and includes a baseplate on which the RSSM sits. The base frame 16a is deep enough compared to the top of the RSSM 14 and the dimensions of the outer bag 25 so that when the outer bag 25 is sealed containing the inner bag assembly, it does not apply any tensional load on the blank 12, as is seen in FIG. 1B. Base frame 16a is not otherwise geometrically critical. It can be machined from aluminum, steel or another suitable metal. The seal may be made from extruded, fully-cured, silicone rubber or other elastomeric material known in the art, or yet to be developed.

The RSSM 14 is a male tool on which the blank is formed, in the case of FIG. 1A, to form a stringer. Typically these structures have uniform cross-section over a length that is slightly longer than the part to be manufactured, although it is a particular advantage of the present invention that it can be applied to non-uniform cross-section structures. Aerospace industry tools are commonly made from steel, invar or composite material. The RSSM 14 may only be used for forming, if a separate tool is used to cure, or may be used for both forming and curing. Aluminum is a less common tooling material because of its high coefficient of thermal expansion but is appropriate as a forming tool material because of its relatively low cost, machinability and the relatively low temperature of the forming process (compared with curing). The RSSM used to demonstrate this invention was formed of Aluminum.

Two vacuum lines of the VBS of FIG. 1 are provided respectively for the inner and outer bag assemblies. As shown, the inner bag assembly has a tubing 18 extending therefrom, for connection via a coupling section that passes through the base frame 16a in a sealed manner. The outer bag is evacuated by a port of the base frame 16a, shown at the peripheral frame and not through the base plate. Thus the outer bag exhaust is integral with the base frame 16a. The tubing 18 and coupling section can be made from any material capable of withstanding full vacuum (1 Bar), including a variety of industry standard plastic or metallic materials which are commonly used during composite processing (such as Teflon, PTFE, stainless steel, and brass). The tubing was made of Teflon and the coupling of stainless steel in the examples of the present invention.

By evacuating the inner bag assembly 10a the inner bag 15, strips 20, heaters 22 and blank 12 are held tightly together as a unitized assembly. The port is used to control evacuation of the air space around the RSSM 14 which ultimately generates a force that forms the blank 12. Various alternative evacuation systems can be used, including a single evacuation system with valves or switches to allow for evacuating either the inner bag, or outer bag. Preferably the system allows for evacuation of both in one mode of operation, and for suction to be applied to only the inner bag in another mode.

FIG. 1A-C therefore schematically show an inner bag system, and an outer bag system with a RSSM 14. The outer bag system is provided for vacuuming the inner bag assembly onto the RSSM 14. The inner bag maintains proper contact between the blank and facets of the strips 20 throughout the process. Heaters and sensors (e.g. thermocouples) of the inner bag assembly are conveniently fixed to the outside of the inner bag, and inner bag evacuation advantageously minimizes thermal contact resistance between the heaters and the blank by removing any air gaps or bubbles. The strips 20 may be made of copper, aluminum, steel, or another material with suitably high thermal conductivity and desired stiffness. The facets aid in the transfer of heat energy within a discrete region of the blank as well as providing the localized engineered stiffness modifier. The outer bag system 10b includes the base frame with integrated exhaust ports, on which a forming tool (RSSM 14) is provided. The blank is shaped by pressure from the outer bag which encloses the inner bag assembly by sealed closure of the covering frame.

These elements assembled make a forming system as shown in FIG. 1B. FIG. 1B also represents time zero of the forming process i.e. before the outer bag is evacuated and prior to any forming of the flat preform, but after the inner bag assembly is completed and evacuated. The forming of the stringer is complex in that it features two concave and two convex bends. The forming process uses localized heating and stiffness modification by leaving a top hat and foot sections (i.e. the 3 blank regions adjacent strips 20 that are horizontal in FIG. 1C) unheated so that they act like a shear force clamp throughout forming. As the top hat and foot areas once formed are parallel, all of the material shearing is localized to two shear web regions (corresponding to the 2 blank regions between the top hat and respective foot sections). The freezing limits freedom of fibres of the blank to bend, constraining the fibres to move with the matrix. During forming, only the shear web heaters are activated to locally lower, in a controlled manner, a viscosity of the matrix of the blank, which ensures that only the material in the shear web region of the blank 12 shears. This regionally selective heating design greatly reduces the potential shearing distances for the plies, which minimizes defects such as wrinkles, waviness, buckles etc. by spatially limiting the regions where shearing occurs: If you heat the whole blank, you have to contend with systematic matrix/fibre orientation differences at every point in the deformation; but if you freeze the matrix and fibre orientations within specific regions, shorter lengths of the fibres are free to deform, and defects can be avoided.

FIG. 1C is a schematic cross-sectional view of a fully formed part 12' showing the location of all forming equipment as the part assumes its final shape on the RSSM 14. FIG. 1C also shows a part 12' formed of the blank 12. After the part is formed, it is heat treated in situ, by utilizing all heaters to relax the part, removing any residual stress built-up during forming, and reducing viscoelastic response once pressure is released (also known as spring out). If the blank is an out-of-autoclave (OOA) prepreg blank, the part may then be cured in situ. If not, the part can be bagged separately on the RSSM, or the entire apparatus may be inserted into a pressure chamber (e.g. autoclave) for curing, or co-curing with adjacent parts of a structure to be built.

FIGS. 2A,B schematically illustrate a second embodiment of the present invention, in which a tapered C-Channel spar is formed. Herein, like features are identified by like terms, and description of these are not repeated, except to note how they may function differently in the embodiments. The tapered C-Channel spar only calls for bends in one direction, and naturally only has 3 regions: a top web and two side flanges, although the width or shape of the top web at different longitudinal cross-sections can vary, leading to challenges in fibre orientation. While the embodiment of FIGS. 2A,B is a symmetric C-Channel spar, symmetry is not requirement, and a kink or assymetrical joggle can be formed.

In general, thicker blanks and larger tool radii, call for larger gaps between stiffer strips 20, so the strips 20 remain substantially flat throughout the process. This may call for one of several variations in the embodiment of FIGS. 1A-C. In general, where curvatures of the bends do not cancel out, an accounting for the "bookending" of the sheared blank 12 edges may be necessary. Bookending refers to the shape formed as one curves a soft cover book; the end changes form square (90°) to an angled end depending on the radius of curvature of the book (i.e. shearing length of inner plies relative to outer plies). If strips 20 are too stiff to wrap around edges of the blank, another means are required for constraining the blank. A bookending hinge 28 is mounted to the two side strips 20 as shown, instead of a ninety degree solid bend. The hinge 28 is required to accommodate the changing geometry of the preform edges as the part is formed, and allows for pressure to be applied on the blank 12 at all stages of the forming. Since the tapered C-channel blank goes through a range of net shapes between flat and fully formed, the strips 20, and specifically the edges thereof, must also be able to change shape to accommodate the change in the end of the blank 12. This was not required with the stringer part of FIG. 1, because all shearing was isolated to the web section and the end of the blank 12 was allowed to maintain its square geometry (freeze zone). The hinge 28 is a biased closed mechanism that gradually opens, such as a leaf or coil spring. The hinge has a lever face that remains in contact with an edge of the blank throughout the shearing that results in bookending.

The C-Channel has a different cross-sectional C shape at every longitudinal spacing from the edge, and this may exacerbate the spacing problem of the large radius bend. Either heaters 22 and strips 20 are shaped, having different dimensions at different longitudinal positions, or their relative separations vary longitudinally. Herein the term strip is not intended to be limited to only rectangular pieces, and wedge shaped or trapezoidal strips may be preferred for some parts.

The heaters 22 shown in FIG. 2A,B are printed circuits encapsulated in Kapton film, divided into three segments. These heaters are considerably more flexible than the wire wound strip heaters described in relation to FIG. 1A-C. This flexibility is useful in the long radii arc area between the strips 20, where significant heater deformation occurs during forming. Thin silicone encapsulated printed circuit blankets may also be used as well as any other sufficiently flexible heating system.

In the case of the stringer application, all heaters were located on respective strips 20 and did not extend between adjacent strips 20. However, when the strips 20 are separated by distance that exceeds a limit, and the region between strips 20 requires substantial heat and pressure distribution and control, additional features of the inner bag assembly may be included. For the tapered C-channel case, the radii outer length is too long to not actively heat this critical area of the part. Therefore, heaters were positioned to extend between the inner and outer strips 20 to actively heat the radii. The strips were not extended into this region because they would deform in the radii region and the inner bag would become difficult to reuse after forming because of difficulty returning the articulated forming caul (AFC: understood as the collection of strips, and their junctions) to a flat condition. In alternative embodiments, the AFC may comprise a very low stiffness copper or aluminum foil (or laminate of a heat-resistant plastic such a foil) covering gaps between the strips to distribute heat.

The inner bag assembly features a heat diffuser 26 serving as an additional heat transfer medium to carry heat energy into the preform radii, nominally in the form of a steel foil (coated for non-adhesion). As conduction of heat through steel is relatively low, heating the steel in the side regions, with corresponding strips 20, does not appreciably heat the freeze zone provided at the top strip 20 (i.e. it does not result in a significant drop in viscosity in the "freeze" region, which would result in a loss of the desired shear force clamping). The diffuser 26 was located under the strips 20, covering the blank 12 and, acts like a spring to flatten the inner bag post-forming. Lastly, the stainless steel foil also avoided imprint features of inner bag components on the bag side of the part during forming, which is important for some parts.

FIGS. 2A,B also show how attention can be paid to edges 20a of the strips, to avoid pinching of the inner bag during forming, and to provide a more graded stiffness transition between the side strips 20 and gaps between the side strips 20 and the top strip 20. This graded transition, along with the steel foil, reduce imprinting on the blank during forming.

Finally, FIGS. 2A,B provide an explicit breather material 27 that is shown sandwiched between the sheet 26 and strips 20 to ensure vacuum distribution throughout the inner bag assembly.

FIGS. 3A,B are schematic illustrations of a forming apparatus comprising a kit with an inner bag assembly, substantially as shown in FIGS. 1A-C. The only differences between these inner bag assemblies are: the sizes and positions of the strips 22. Instead of a male tool, for the embodiment of FIGS. 1A-C, FIG. 3A shows a sweeping bi-curved mold half 14 with a curved edge 14b. The blank 12 is thus formed with a single edge that is bi-curved. In yet other embodiments, the blank 12 may be formed with multiple edges in a male, female, or more complicated mold having a plurality of facets with differing orientations. In particular, the present invention allows for challenging forming of thick parts, parts with facets at sharp angles to each other (e.g. 30-150°/210-330°, or 60-120°/240-300°), or parts where two mold faces meet along an edge that is curved in two dimensions. In the present embodiment, the strips 20 do not have the same spacing and width at all longitudinal cross-sections. In particular, bending between a left-most strip 20 and the three right strips 20, happen at different positions, at different cross-sections, unlike the stringer example which featured a constant cross-section at all longitudinal positions (although other stringers are known to have twist, curves or joggles).

One difference to note here is the fact that the end strips 20 are bent at ninety degrees despite the fact that the bottom area of the finally formed part will feature "bookending" since the material will shear from the angle break in the tool all the way to the bottom of the part. The reason that no bookending hinge was required in this case, compared to the tapered C-channel part, is because the blank thickness and radius of curvature are small enough that the "bookending" effect is not critical.

Figure 4:
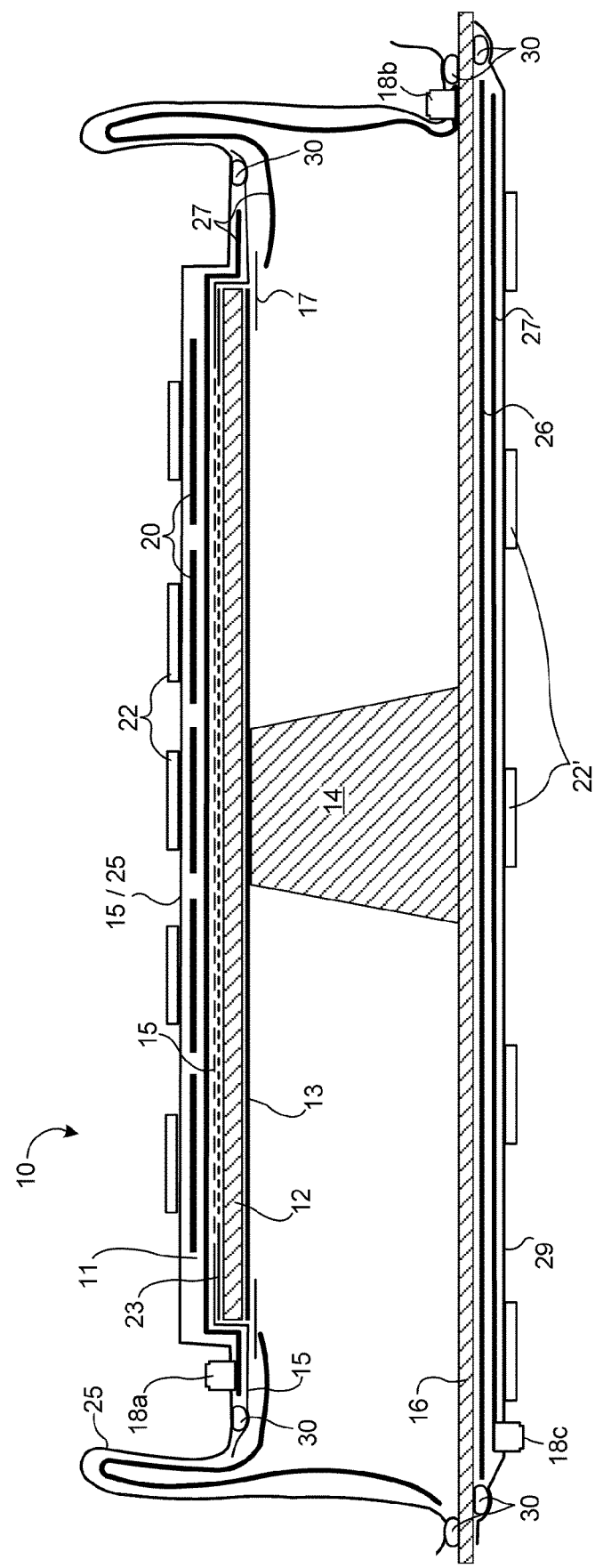
FIG. 4 is a schematic cross-sectional illustration of a kit in accordance with a variant of the first embodiment, using heated tooling and a unitized inner and outer bag.

FIG. 4 shows the stringer part forming as in the FIG. 1 embodiment, with integral RSSM 14 heating. As will be appreciated by those of skill in the art, some part geometries can be formed without a base frame 16a or cover frame 16b. All that is formally required are seals, which can be supplied by seals 30. FIG. 4 also shows that the outer bag 25 and inner bag 15 can be partially combined into a VBS that avoids a second membrane above the inner bag breather 27. A permanent fusion of the inner bag 15 and outer bag 25 is shown in this embodiment, in that the volume 11 is provided between an inside of outer bag 25, and the inner bag 15. In a sense the outer bag 25, between the seals 30 with the inner bag 15, is also the inner bag 15. The VBS 10 operates in much the same way as the embodiment of FIG. 1 except that: the outer bag 25 has to be in place (at least between the seals of the inner and outer bags) before the inner bag assembly can be evacuated and vacuum clamped together. Industry-standard tool-part locating mechanisms can be used to align the inner bag assembly with RSSM 14. Subsequently the outer bag 25 can be edge sealed to base plate 16 at seals 30.

FIG. 4 also shows seals 30 of the inner bag 15 and outer bag 25 at two edges to define the volume 11. These seals are located away from the blank 12, avoiding any edge marking of the blank otherwise caused by sealant 30, and avoiding subjecting the seal 30 to any shearing action during depressurization. An impermeable release material 13 is shown on a bottom side 12a of the blank 12, but may not be used, for example if it tends to buckle and leave undesirable surface marks on the part 12', or may be provided only along a peripheral edge to prevent tape 17 from directly contacting the blank 12. The release material 13 may be gas impermeable (backing papers may be gas permeable) or may be provided in addition to an impermeable membrane, however Applicant finds substantial advantage to reducing a number and stiffness of material layers between the RSSM surface 14 and the blank surface 12a, and thus prefers to provide the inner bag with a means to suction grasp the blank 12 over a top or outer surface 12a thereof, and possibly the side edges 12c.

In alternative embodiments, the release material 13 extends beyond the edge of the blank and makes a seal with the inner bag, and may be integrated with, or may surround a backing of the blank. To this extent the release material 13 may be understood to be a part of the inner bag, and the inner bag is understood to surround the blank entirely. As the release layer is thin, and has a reliable, gap-free, interface with the bottom forming surface of the blank, such as the backing paper of a bottom layer of the prepreg consolidated to form the blank, the inner bag assembly still provides suitable exposure of the forming part of the bottom of the blank. An advantage of this configuration is a simpler and more robust closure of the inner bag. A disadvantage of this example is the presence of the release layer between the blank and the RSSM which must be properly managed to avoid creasing, wrinkling, or bunching up, all of which would be imparted into the bottom surface of the formed part.

In FIG. 4, a heating system with now-familiar components is also shown for heating RSSM 14 and base plate 16, from a back-side thereof. Specifically, a tool bag 29 is provided that covers a layer of breather 27 (which is also shown for the outer bag 25) and a heat diffuser 26. The breather 27 improves uniformity of thermal contact resistance between the base plate 16 and the tool's heaters 22', by ensuring air flow and preventing the tool bag 29 from choking off. Breather 27 may also be provided between sensors (not shown), or the sensors may be strategically located outside of the tool bag 29. The tool bag 29 improves thermal contact between the heaters 22' and the base plate 16. The tool bag 29 may be made from Stretchlon™ or another industry accepted bagging material capable of withstanding the heater temperature. The inner bag 15, outer bag 25, and tool bag 29 each has a respective evacuation port 18a,b,c. Another configuration of integral tool heating might include machining slots or holes in the tool for insertion of metallic heater cartridges. This strategy would be applicable for integrally heating thick section metallic tooling.

While the tool heating apparatus is shown in one form, it will be appreciated that other tool heating apparatus can alternatively be used. For example, copper sheet can be friction fitted to the base plate 16, or joined with a thermally conductive epoxy, to avoid a tool bag. By providing a network of heaters surrounding the blank: a highest uniformity of temperature can be reached most quickly, as may be useful for the relaxation treatment; and dynamic temperature control within the blank can be improved.

While the foregoing AFCs have only their elements, bagging, valves, seals, breathers and release elements, additional structures may be provided for, ensuring spacing between the elements, hinges, and pressure intensifiers, for example. A pressure intensifier can be used in conjunction with the AFC to increased pressure in the formed radii and specifically in the gaps between the strips 20. Pressure intensifiers can be inflatable or solid and are typically made from elastomers.

Example 1: Hat Stiffener Forming Process
Specification: 3' Carbon-Epoxy Composite This process involved blank layup, Inner Bag Assembly, Outer Bag Assembly; Forming; Relaxation; De-Bagging and Inspection; and Curing.

Blanks (also known as a charge, or preform) can be assembled by a variety of prior art methods, or purchased as a commodity. For example: manual layup, where the prepreg tape cut to the laminate ply size are applied sequentially, and debulked (compressed under vacuum every few-several layers according to a schedule, to remove trapped gas and consolidate); Automated Fibre Placement (AFP), where a narrow (e.g. 0.125"-2.5" wide) tape is applied sequentially to make each ply, or Automated Tape Laying (ATL) process, where wide (e.g. 1'-2' wide) bands of tapes are applied sequentially to make each ply. With AFP or ATL, the band/tapes are compressed, in situ, by a heated roller, eliminating or reducing the need for debulking. The blanks in accordance with Example 1, and all other examples of the present invention, were formed by manual layup. Specifically: 15 plies are cut from a roll of prepreg tape, as per Table 1.

TABLE 1

Ply Cutting details.

| Orientation (°) | 0 | 90 | 45 | 135 |
|---|---|---|---|---|
| Width (in) | 8 | 8 | 8 | 8 |
| Length (in) | 36 | 36 | 36 | 36 |
| # of cut plies | 4 | 4 | 4 | 3 |

The plies are assembled into a laminate, as per Table 2. Note: this lamination sequence and assembly schedule can be adapted to varying part requirements.

TABLE 2

Laminate Assembly Schedule.

| Orientation (°) | | | | | | | | | | | | | | |
|---|---|---|---|---|---|---|---|---|---|---|---|---|---|---|
| 90 | 45 | 0 | 135 | 90 | 45 | 0 | 135 | 0 | 45 | 90 | 135 | 0 | 45 | 90 |
| Ply # | | | | | | | | | | | | | | |
| 1 | 2 | 3 | 4 | 5 | 6 | 7 | 8 | 9 | 10 | 11 | 12 | 13 | 14 | 15 |
| Debulking | | | | | | | | | | | | | | |
| 1 | | | 2 | | | | 3 | | | | 4 | | | 5 |

Five stacks, each consisting of three plies, are assembled and debulked individually. To provide ideal temperature sensing, it is useful to insert temperature sensors into the blank. This would not normally be performed for industrial part production, but is useful for establishing correct heating and vacuum pressure regimens, as well as calibrating heaters/sensors of a VBS. Once the VBS is calibrated, and the production process is established, fewer or lower temporal and spatial resolution, heaters are used to monitor the process, and these need not be embedded within blanks, and if so are limited to a peripheral "trim" part of the blank, that is distinct from the forming part. In the examples herein, thermocouples are inserted between the plies. These thermocouples are used to control heaters during the forming process. Note, control thermocouples are located within the peripheral region of the part to avoid the undesirable effects of an inclusion within the structural part.

Thermocouples were manufactured using a pair of 0.005 inch thick thermocouple K-type wires, which are welded on one end to make a junction. The thermocouple is placed over an adhesive side of a 0.003" thick, 1" wide pressure-sensitive adhesive Kapton™ tape while maintaining an approximate 0.125" spacing between the wires. A second piece of the tape is then placed over the thermocouple wires encapsulating them. The last inch of the wires' free ends is not encapsulated to be fed into a K-type thermocouple mini-connector. Excess width of the tape is cut making a 0.25" wide thermocouple strip. Note: thermocouples and other suitable temperature sensors of acceptable size and manufacturing detail can alternatively be used to control and/or monitor forming processes, if designed to measure the process temperatures.

Specifically the thermocouples are distributed throughout the layup at junctions between plys #5,6, 6,7, 7,8, and 9,10, with one end of the thermocouples embedded 3" into the blank, and extending 15" out of the blank, with 1" of the wires bare.

For debulking, the stacks are placed on a flat plate, covered with wide layers of perforated Fluorinated Ethylene Propylene (pFEP) release film, followed by an N10 breather material, and enclosed in a vacuum bag. The stack is subjected to a minimum of 28 inHg pressure for 15 minutes. Note: the materials and process used during the debulking process are industry standard is substitutable with other known procedures.

The debulking of each stack was performed, then stacks 1 and 2 were debulked together, 3 and 4 debulked together, while keeping the global ply orientation, and finally, all stacks are combined and the final debulking is conducted. Alternative the debulking routines could have been used to consolidate the blank. Once debulked the blank was bagged and frozen for later use, or used immediately. In either case, the shelf life is limited by the cumulative prepreg "out of freezer" time.

The blank was vacuumed to an inner bag assembly. The purpose of the Inner Bag is to maintain physical contact and minimize thermal contact resistance between the heaters (via AFC elements/copper sheet) and the laminate (part) throughout the forming process, including before the outer bag is evacuated. Without the inner bag, uneven physical deformation and heat transfer, and therefore improper forming, would result due to poor contact. Upon completion of the forming phase, the laminate must be in direct contact with the tool, so the inner vacuum bag has to be applied from the top or non-tool side of the part.

The Inner Bag was provided with an independent vacuum source (from the outer bag described hereinbelow). Following is the assembly process:
1. A sheet of nylon bagging film (strechlon) with a vacuum port (mushroom) installed, is pulled taught and temporarily affixed to a work table.
2. Metallic sheets (sized and shaped to provide localized heating and increased stiffness) were placed over the film and taped to it. These metallic sheets were selected for a combination of thermal conductivity and stiffness. Possible materials include but are not limited to copper (used in this specific case), aluminum or steel. Other forming applications have called for multiple materials simultaneously depending on the requirements. The metallic sheets were hinged together with tape, but in other embodiments, an actual mechanical hinge i.e. piano type, elastomeric bond, or spring-biased device could be used. In this specific case, the copper facets were hinged together using flashbreaker tape (typical composites clean room supply).
3. Double sided high bond tape is applied to the exterior of the inner bag section.
4. A rectangular sheet of thin of N-10 breather material is cut to the size to cover the area with the high bond tape perimeter described in step 3.
5. A second sheet of nylon bagging (strechlon) is placed on the work table and is locally perforated in a rectangular area at the center, sized to match a forming region of the blank.
6. The perforated nylon sheet prepared in step 5 is taped to the inner bag (the part with the copper forming elements installed on it) using the high bond tape already placed on the inner bag in step 3.
7. At the end of inner bag preparation, heaters and process thermocouples are installed on the bag directly over the copper facets.

Once the Inner Bag Assembly is constructed, the Outer Bag assembly is provided, and placed around the RSSM. The Outer Bag is used to evacuate the air around the laminate/tool and impart physical force to form the laminate over the RSSM. Note: the outer bag can be constructed from consumable or reusable material depending on the process/production requirements. Once the outer bag is evacuated, it too acts to hold the inner bag assembly together, and abets the inner bag's function.

The forming is performed as follows:
1. Provide preform at room temperature (remove preform from freezer and thaw prior according to blank handling).
2. Trim blank to 12"×7⅝" removing an equal amount of material (nominally 3/16" from each long edge) to permit proper fit with the inner bag.
3. Install preform on inner bag with perforated rectangular region aligned with the forming part of the blank, and pull full vacuum to establish contact between heaters and copper facets with the blank. FIG. 5A shows an inner bag assembly.
4. Place the inner bag/blank assembly on the tool. Tooling pins or a visual locating mechanism was used.
5. Manage wires and air evacuation tube to prevent undesirable tension on thermocouples, heaters or the inner bag assembly during forming.
6. Connect all thermocouples and check readings.
7. Place pieces of breather material to ensure outer evacuation bag is protected from tool edges and other possible sources of puncture.
8. Clean outer bag seal.
9. Ensure purge valve on outer evacuation bag frame is open.
10. Install frame with evacuation bag.
11. Load applicable control system file for the specific part/process.
12. Start the forming control system which will power the forming process heaters on the stringer shear web only to reach the forming process temperature. For example, for 977 resin, the cycle is 10° F./min from room temperature to 170° F. and hold for 5 min. to allow the part to reach temperature equilibrium and uniformity.
13. Once the coldest control thermocouple(s) are at 165° F., begin 5 minute countdown to start evacuation of forming bag.
14. Close purge valve on evacuation bag frame and begin forming evacuation at 2 SLPM via flow controller. Note: this evacuation rate is part, material and apparatus specific.
15. Once steady state vacuum is reached (approximately 26 inHg) remove flow controller from line to boost pressure to maximum allowable vacuum (flow controller causes a pressure drop).

After the completion of the forming phase, which may take about 10 minutes, the blank is ready for the relaxation phase. Relaxation involves raising the whole part to a temperature near the forming temperature, which is performed with full field (all forming element) heating. Once "freeze" stringer regions reached the low end temperature tolerance for forming (165° F. for 977), heating continued to the relaxation process temperature (10° F./min to 180° F. for 977). Once the coldest thermocouple(s) were at the low end temperature tolerance for relaxation (175° F. for 977), a 15 minute relaxation temperature hold began. Note: the time/temperature combinations for forming and relaxation are driven by part, material and production requirements. There are multiple time/temperature combinations that are applicable for most material systems. At the end of the relaxation hold, all heaters were deactivated and the part is cooled while under vacuum. The cooling was passive, however in other embodiments active cooling with compressed air was used, and slow, controlled, cooling has been used in further embodiments. Once the part temperature is below 100° F. the outer bag may be opened and the part may be removed and/or inspected prior to the curing. FIG. 5B shows the formed stringer.

Once cooled, the outer bag was opened and the inner bag/part assembly removed. Note: the prepreg backing paper on the bottom of the part is kept in place during the forming, and relaxation steps as it improves the coefficient of friction between the part and the tool surface. The backing paper was removed for curing. The part can be removed from the tool for inspection if required (as per specific production requirements), moved to a separate cure tool (as required), possibly for co-curing with other parts, or moved to storage (freezer). The curing of parts we produced was performed in industry-standard manner using a curing tool in an autoclave.

FIGS. 5A,B are two photographs that show pre- and post-forming of the stringer structure. FIG. 5A shows the entire forming assembly, including preform, prior to forming i.e. the blank is flat. FIG. 5B is of the same forming equipment/application as FIG. 5A, but in the post-formed condition where the preform has now taken the shape of the tool. Note, the forming apparatus in FIGS. 5A,B is similar to the sketch in FIG. 4, in that the inner bag and outer bag are contained in the same unit i.e. the inner bag is extended to also create the outer bag enclosure. In this particular example, the inner and outer bags have been combined into one system so the heaters and thermocouples have been fixed on the outside of the bagging solution.

Example 2 Stringer Forming with a Two Part VBS

A forming apparatus with the same RSSM, and elements can be assembled with the design of FIG. 1A-C in respect of the inner bag and outer bag. This was performed. FIGS. 5C,D are two photographs that show pre- and post-forming of a similar stringer, in a revised embodiment in which the inner bag and outer bag are separable. FIG. 5C,D are similar to FIG. 5A,B in that they feature the entire forming assembly, including the preform, for pre and post-forming but differ in that they feature a separate inner bag and outer bag, such as illustrated in FIGS. 1A-C. The two different examples demonstrate the flexibility of the forming apparatus invention and the potential to setup the equipment in a variety of configurations each with their distinct benefits and disadvantages. For example, in FIG. 5A,B the inner bag and outer bag are one piece and therefore simplified. The apparatus can also be made of consumable materials. Alternately, in FIGS. 5C,D, the VBS may be assembled from more robust, reusable materials, such as the silicone outer bag shown.

FIG. 5E is the post-formed and post autoclave cured stringer part. The small radii at the top and bottom of the part are features that make this geometry particularly difficult to form. An automated processes like AFP or ATL are inefficient as they would need to slow down considerably at these transitions.

The FIG. 6 series shows a variety of stringer part micrographs. They show the top radius (FIG. 6A right and FIG. 6C left), the top hat section (FIG. 6B) the shear web region (FIG. 6D) and the bottom radii (FIG. 6E left and FIG. 6F right). The micrographs demonstrate a successful forming operation in that the fiber paths are well aligned to the tool shape and they feature no defects that plague prior art composite forming, including but not limited to: buckling, kinking, waviness and ply splitting. This is, in part, attributable to the fact that the elements of the AFC remain in fixed contact with respective parts of the top surface of the blank throughout forming, and because of the good mechanical and thermal load transmission to the blank, via the AFC.

Example 3 L-Shape Forming

Figure 7A:
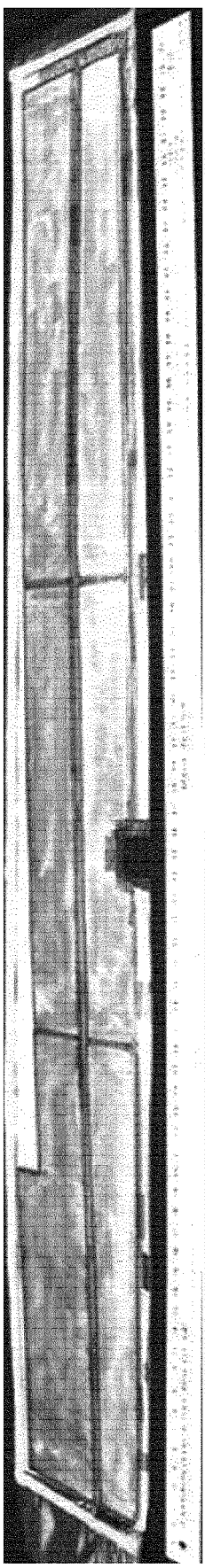
FIGS. 7A,B are photographs of an L-shape forming example, respectively showing a two-enclosure vacuum bag system, prior to forming, and post-forming.
Figure 7B:

Substantially the same method can be used with a different arrangement of forming elements, for example to form an L shaped frame. FIGS. 7A,B are photographs showing the L-shape frame forming example. FIG. 7A shows the copper facets during construction of the inner bag. Note that the inner bag elements are divided into six rather than two because the portion of the tool below a breaking edge of the inner bag assembly is actually curved along a length of the tool. FIG. 7B shows the entire forming assembly, including the preform, post-forming where the preform has assumed the shape of the tool.

Example 4 Tapered c-Channel Forming

Figure 8A:
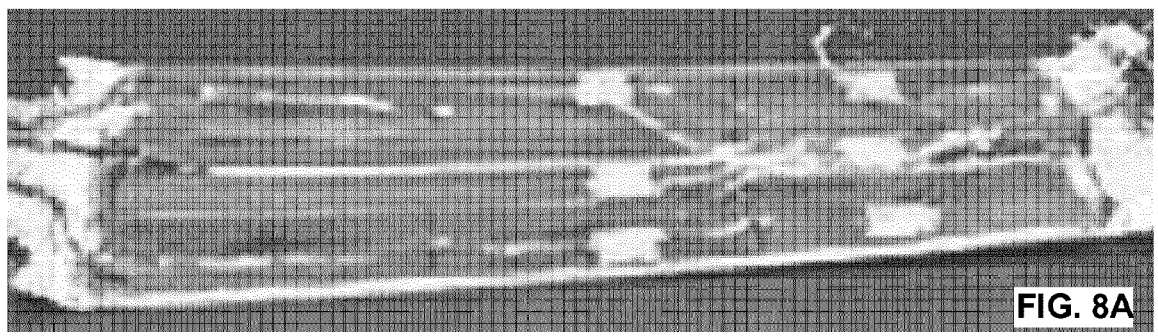
FIGS. 8A-D are photographs of a C-shape forming example, respectively showing a two-enclosure vacuum bag assembly, the assembly on a RSSW prior to forming, post-forming in the vacuum bag, and finally de-bagged.
Figure 8B:
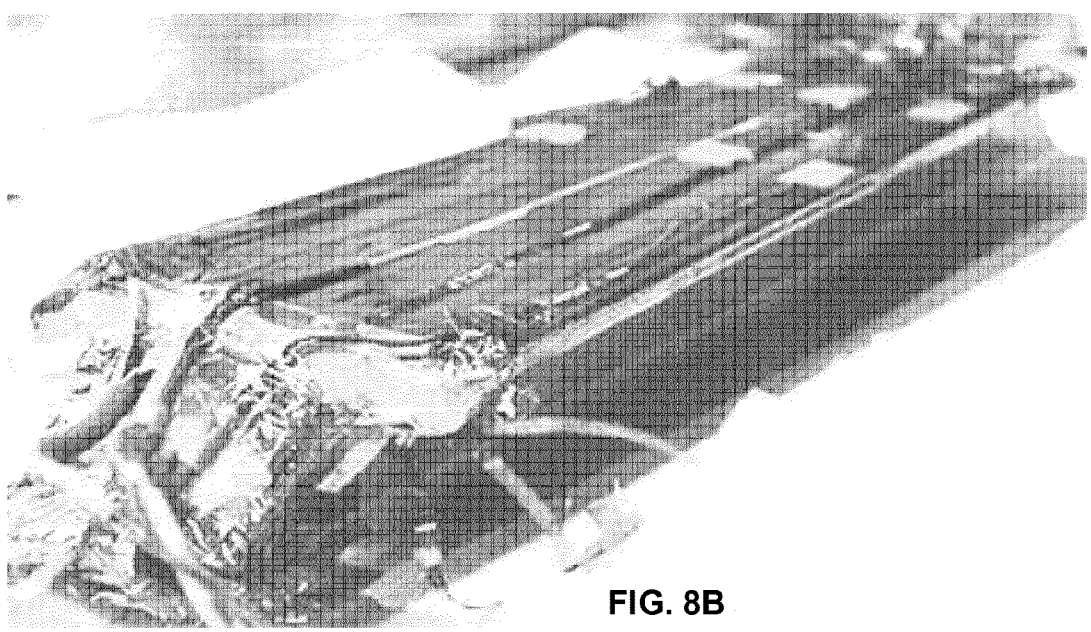
Figure 8C:
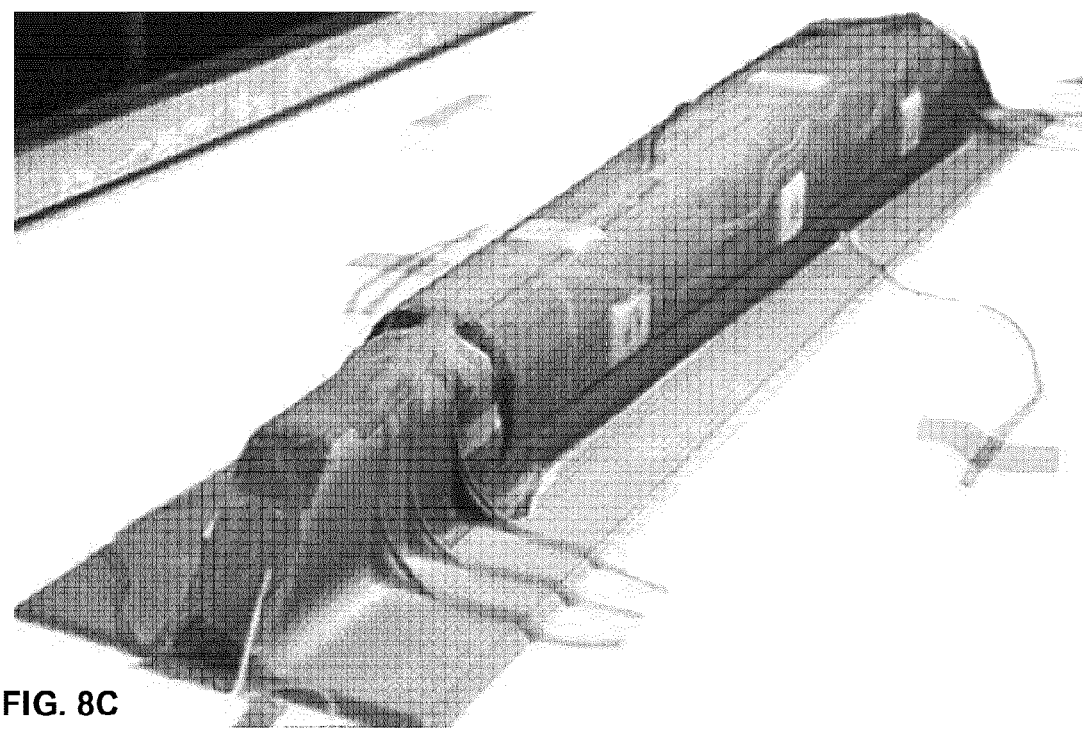
Figure 8D:
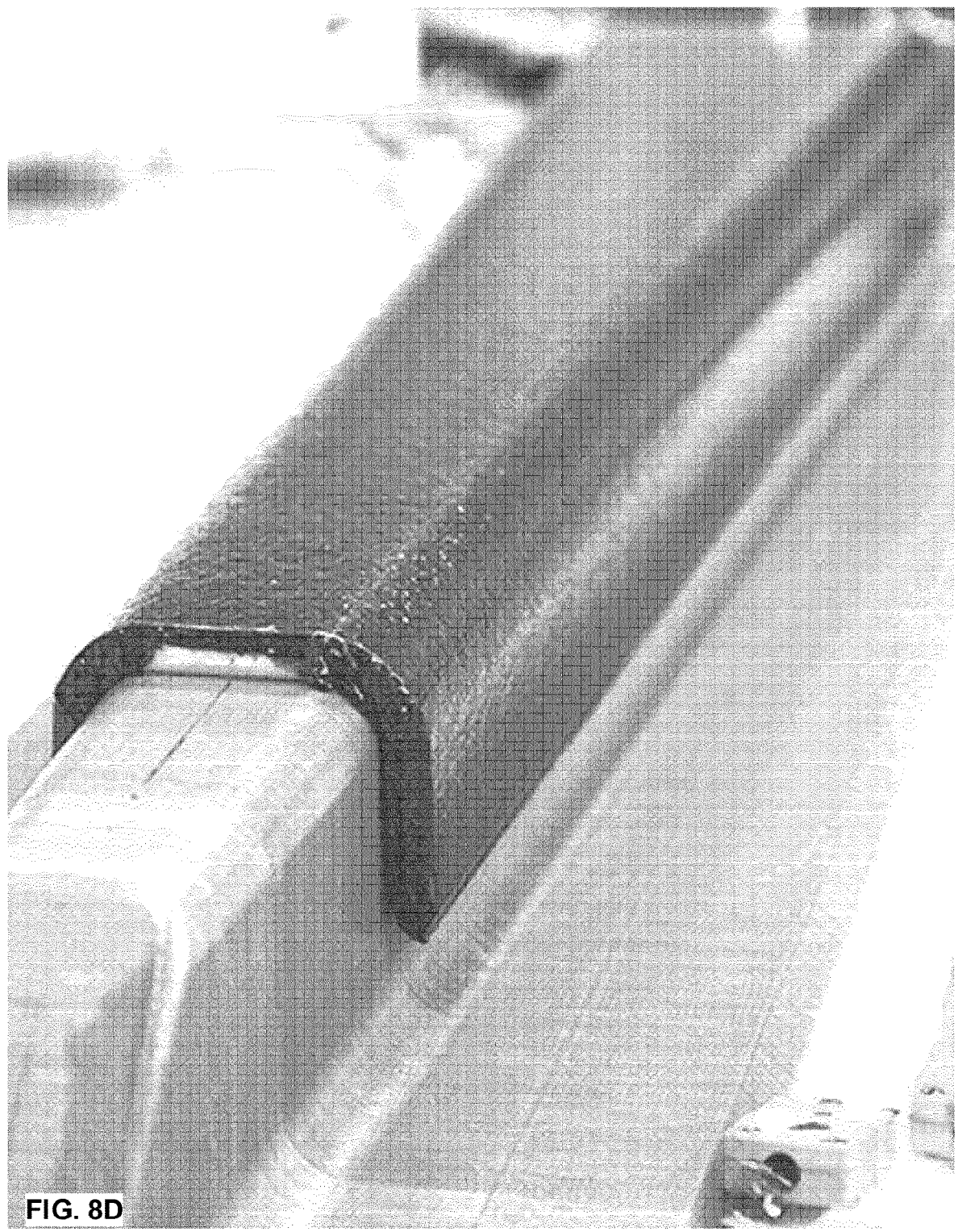

The same process, with a variation in the number, positions and orientations of the forming elements can be used to form a c-channel. FIG. 8A shows the inner bag assembly without preform. FIG. 8B shows the inner bag/preform assembly prior to forming and without the outer bag installed. FIG. 8C shows the entire forming assembly, including the preform. The outer bag is featured in FIG. 8C although is difficult to distinguish since it is transparent and formed to the shape of the inner bag/preform assembly. Note, a transparent outer bag is not required but is beneficial in that it permits the operator to visually confirm a number of details during the forming process. FIG. 8D is the post-formed, pre-cured tapered c-channel part. Note a Teflon insert at the end of the part is used to enable demoulding after the subsequent curing step. Bookending of the formed part is shown. At this point the part is ready to be bagged up for a typical autoclave cure according the material manufacturer's recommended cure cycle.

FIG. 8D is a photograph of the part as formed.

Figure 9A:
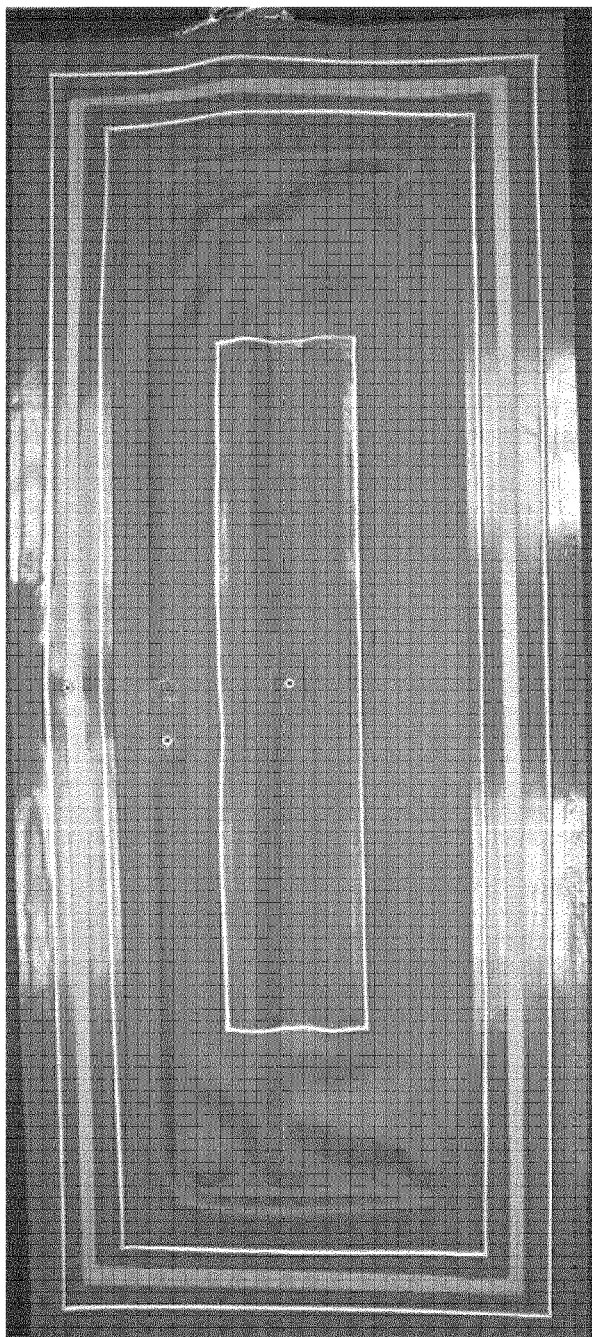
FIGS. 9A,B are photographs of a semi-productized two enclosure vacuum bag system with heaters and forming elements, sensors and defining a blank enclosure, and having a seal region adapted to form a forming enclosure around a RSSW.
Figure 9B:
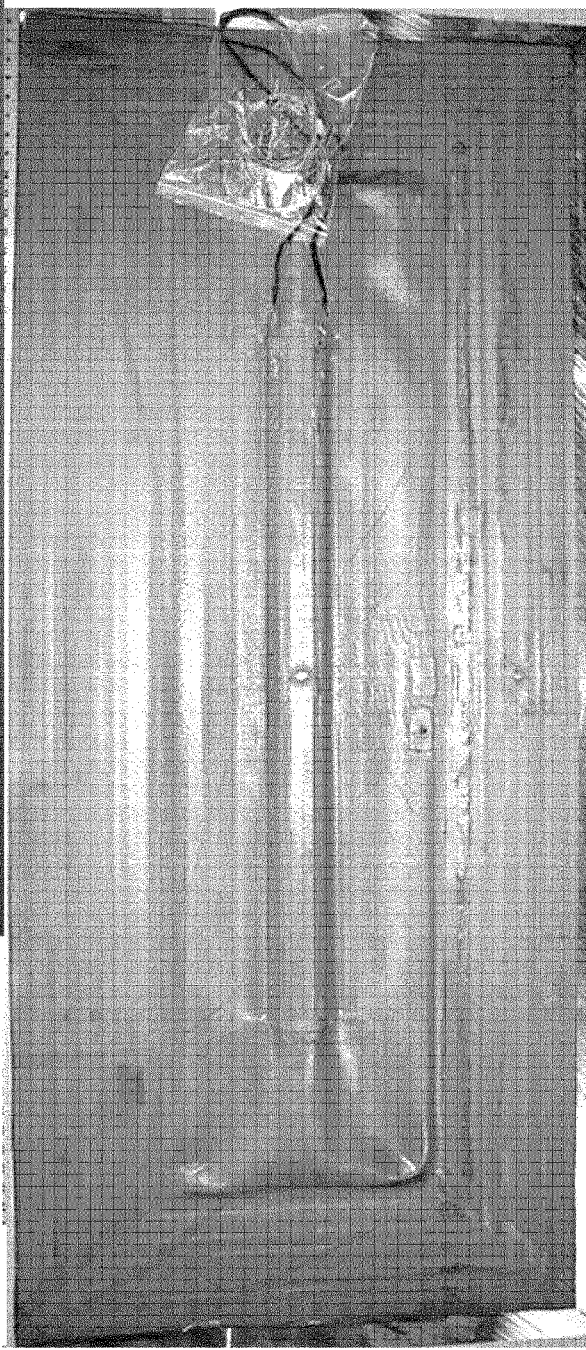

Finally, FIGS. 9A,B are top and bottom sides of a semi-productized concept for 36 inch stringer inner bag which includes integrated thermocouples, heaters, forming elements and multiple vacuum ports. The inner bag includes multiple vacuum bag regions for inner bag/blank with integrated forming elements, heaters and thermocouples (1), outer evacuation bag for forming (2), and outer bag seal (3). Note, all bagging regions feature their own integrated vacuum ports which pass through the bag.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A vacuum bag system (VBS) for forming pre-consolidated composite blanks, the VBS comprising:
    a blank enclosure comprising: a first barrier membrane adapted to cover a first side of the blank; a first seal dimensioned to seal the barrier around a periphery of the blank leaving at least a forming part of a second side of the blank exposed for forming, and a first evacuation system;
    an articulated forming caul (AFC) comprising: at least two forming elements, each forming element having a stiffness greater than that of the first barrier membrane, and defining a facet facing a region of the first side blank within the forming part; at least one independently controlled, heater integrated with, or coupled to the forming element, adapted to heat the facet from room temperature to at least 150° C. within 1 hour; and
    a forming enclosure with a second barrier membrane, a second seal dimensioned to seal the barrier around a periphery of a rigid single-sided mold RSSM, and a second evacuation system,
where the forming elements of the AFC are receivable within the blank enclosure, or bonded to an interior or exterior of the first membrane,
whereby:
actuating the first evacuation system with the AFC in place, and a blank sealed against the first seal, brings the facets into uniform thermal contact resistance, and mechanical contact, with the blank; and
sealing the second seal around the RSSM with the blank and facets in place over the RSSM, forms a closed vacuum forming chamber between the RSSM and the second side of the blank, that can be depressurized by the second evacuation system to form the blank to the shape defined by a space between the RSSM and the AFC.

2. The VBS according to claim 1 further comprising a breather material or a release film between: the first side of the blank and the facets or first membrane, if the facets or first membrane would otherwise pose a risk of obstructing evacuation; or the second side of the blank and the RSSM, if the RSSM would otherwise pose a sealing risk with the blank's forming part.

3. The VBS according to claim 1 wherein the AFC further comprises at least one joint between each forming element and another forming element, the joint comprising one of: a mechanical hinge joint, a translational joint, a fabric-type hinge, or an elastic joint having low resistance to bending relative to all other degrees of freedom.

4. The VBS according to claim 3 wherein the fabric-type hinge or elastic joint is provided by adhering the forming elements to the first membrane, with sufficient spacing between them that the first membrane provides the jointing material.

5. The VBS according to claim 1 wherein edges of the forming elements, and the facets, are rounded or padded to preclude puncture risk.

6. The VBS according to claim 1 wherein the first membrane:
has puncture holes for receiving wires for the heaters and a seal around the wires;
has markings for mounting the heaters on an external side thereof, in alignment with the forming elements mounted on an internal side thereof;
has markings for aligning integrated forming elements and heaters; or
has the forming elements and heaters bonded thereto.

7. The VBS according to claim 1 wherein the second membrane is: a peripheral strip surrounding the first membrane, with a third seal between the first and second membrane; or dimensioned to cover the blank enclosure, and is mechanically separable from the first barrier membrane.

8. The VBS according to claim 1 wherein the AFC further comprises a metallic stiffener positioned between the facets and the blank, the stiffener providing at least one of the following: an elastic spring back for releasing the AFC from the blank or release film after forming; a heat diffusion medium for distributing heat from the heaters more uniformly across the forming part of the blank; shielding the blank from imprint features otherwise imparted by AFC components during forming.

9. The VBS according to claim 1 wherein the first evacuation system comprises a port with a valve that permits a closure of the blank enclosure once a desired vacuum is established, while seals to the forming enclosure are established and the closed vacuum forming chamber is evacuated, and then opened to equilibrate pressures within the blank and forming enclosures.

10. The VBS according to claim 1 wherein the first evacuation system comprises a port with a pressure supply tube that extends through the forming enclosure and is sealed therewith.

11. The VBS according to claim 1 wherein the heaters are provided by an array of heaters integrated into a flexible sheet that covers the first membrane.

12. A kit comprising the VBS according to claim 1, further comprising the RSSM, which has two mold faces of differing mean orientation, and an edge between the two mold faces aligns with a spacing between the adjacent facets.

13. The kit according to claim 12 wherein the differing mean orientation includes an internal angle of 30-150°, or 210-330°, or the two mold faces meet along an edge that is curved in two dimensions.

14. The kit according to claim 12 further comprising program instructions for controlling the heaters, in response to a temperature sensor in the RSSM, or AFC, and for controlling an evacuation system, to form the blank.

15. The kit according to claim 12 assembled with a blank to form a part.

16. A vacuum forming system, comprising:
an interfacial vacuum bag having a sealing edge for sealing against a periphery of a preconsolidated, multilayer polymer composite reinforced blank;
at least two forming elements in or on the interfacial vacuum bag, each element having a facet oriented to substantially face a respective region of a first surface of the blank;
an evacuation port and pump for evacuating air between the facets and the blank;
at least one heater for each facet of the forming elements, the heaters separated by a gap, and having an effective joint permitting the heater to pivot during a forming process while remaining close to the blank;
least one temperature sensor for measuring a temperature of the blank;
a forming tool; and
a forming vacuum bag surrounding the interfacial vacuum bag, and heater on the tool, for evacuating air between the forming vacuum bag and the tool.

17. Forming the composite part according to claim 16 further comprising cooling the part.

18. Forming a composite part by:
placing an articulated forming caul (AFC) into or onto a blank enclosure of a vacuum bag system (VBS), the AFC comprising at least two forming elements, each element having a blank-facing facet, where each element is effectively jointedly coupled to at least one adjacent element; and having a respective, independently controlled, heater integrated with, or coupled to the element;
sealing the blank enclosure against a periphery of the blank leaving a second side of the blank exposed, at least over a forming area thereof;
depressurizing the blank enclosure the to bring the blank and the facets into uniform thermal contact resistance, and uniform mechanical contact;
placing the blank and enclosure into a registered position on a rigid single-sided mold (RSSM);
sealing a forming enclosure around a periphery of the RSSM; and
evacuating the forming enclosure to draw the blank into conformity with the RSSM while controlling heat delivered respectively to the facets, to facilitate substantial deformation of the blank with the facets moving from an initial pose in contact with the blank into a position meeting respective faces of the RSSM.

19. Forming the composite part according to claim 18 further comprising subsequently heating all facets concurrently to relax any stresses built up in the part during forming; and then cooling and inspecting the part.

20. Forming the composite part according to claim 19 further comprising reinserting the part into the vacuum bag, and heating all facets concurrently to cure the part.

* * * * *